United States Patent
Egger et al.

(10) Patent No.: US 11,941,490 B2
(45) Date of Patent: Mar. 26, 2024

(54) STRETCH FACTOR ERROR MITIGATION ENABLED QUANTUM COMPUTERS

(71) Applicant: International Business Machines Corporation, Armonk, NY (US)

(72) Inventors: Daniel Josef Egger, Thalwil (CH); Don Greenberg, New York, NY (US); Douglas Templeton McClure, III, Chappaqua, NY (US); Sarah Elizabeth Sheldon, White Plains, NY (US); Youngseok Kim, Upper Saddle River, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 17/652,000

(22) Filed: Feb. 22, 2022

(65) Prior Publication Data

US 2022/0179732 A1 Jun. 9, 2022

Related U.S. Application Data

(63) Continuation of application No. 17/095,030, filed on Nov. 11, 2020, now Pat. No. 11,281,524.

(51) Int. Cl.
*G06N 10/00* (2022.01)
*G06N 10/20* (2022.01)
(Continued)

(52) U.S. Cl.
CPC ............ *G06N 10/80* (2022.01); *G06N 10/00* (2019.01); *G06N 10/20* (2022.01); *G06N 10/70* (2022.01);
(Continued)

(58) Field of Classification Search
CPC ........ G06N 10/80; G06N 10/00; G06N 10/20; G06N 10/70; G06F 11/0706; G06F 11/076; G06F 11/0793; B82Y 10/00
See application file for complete search history.

(56) References Cited

U.S. PATENT DOCUMENTS

| 10,622,978 B1 | 4/2020 | Debnath et al. |
| 10,643,143 B2 | 5/2020 | Bloom et al. |
| (Continued) |

FOREIGN PATENT DOCUMENTS

| WO | 2013021217 A2 | 2/2013 |
| WO | 2020/047444 A1 | 3/2020 |

OTHER PUBLICATIONS

E. Wilson, S. Singh and F. Mueller, "Just-in-time Quantum Circuit Transpilation Reduces Noise," 2020 IEEE International Conference on Quantum Computing and Engineering (QCE), Denver, CO, USA, 2020, pp. 345-355, (Year: 2020).*

(Continued)

*Primary Examiner* — Cynthia Britt
(74) *Attorney, Agent, or Firm* — Amin, Turocy & Watson, LLP

(57) ABSTRACT

Techniques regarding quantum computer error mitigation are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise an error mitigation component that interpolates a gate parameter associated with a target stretch factor from a reference model that includes reference gate parameters for a quantum gate calibrated at a plurality of reference stretch factors.

20 Claims, 16 Drawing Sheets

(3 of 16 Drawing Sheet(s) Filed in Color)

(51) Int. Cl.
   *G06N 10/70* (2022.01)
   *G06N 10/80* (2022.01)
   *G06F 11/07* (2006.01)

(52) U.S. Cl.
   CPC ........ *G06F 11/0706* (2013.01); *G06F 11/076* (2013.01); *G06F 11/0793* (2013.01)

(56) References Cited

U.S. PATENT DOCUMENTS

| | | | |
|---|---|---|---|
| 10,755,193 | B2* | 8/2020 | Kandala ............ G06N 10/00 |
| 2014/0191752 | A1 | 7/2014 | Walsworth et al. |
| 2018/0330265 | A1 | 11/2018 | Kelly |
| 2019/0026211 | A1 | 1/2019 | Wallman et al. |
| 2019/0042392 | A1 | 2/2019 | Matsuura et al. |
| 2019/0080255 | A1 | 3/2019 | Allen et al. |
| 2020/0175409 | A1 | 6/2020 | Kandala et al. |
| 2020/0184362 | A1 | 6/2020 | Sukachev et al. |
| 2020/0311220 | A1 | 10/2020 | Gunnels et al. |
| 2020/0364602 | A1 | 11/2020 | Niu et al. |
| 2021/0152189 | A1 | 5/2021 | Murali et al. |

OTHER PUBLICATIONS

S. Tomkins and R. de Sousa, "Noise Mitigation with Delay Pulses in the IBM Quantum Experience," 2020 IEEE International Conference on Quantum Computing and Engineering (QCE), Denver, CO, USA, 2020, pp. 413-418, (Year: 2020).*

Temme et al., "Error Mitigation for short-depth Quantum Circuits", arxiv, Nov. 6, 2017, 15 pages.

Stamatopoulos et al., "Option Pricing using Quantum Computers", arxiv, Jul. 2, 2020, pp. 1-20.

Dumitrescu et al., "Cloud Quantum Computing of an Atomic Nucleus", arxiv, Jan. 11, 2018, pp. 1-6.

Mell et al., "The NIST Definition of Cloud Computing, Recommendations of the National Institute of Standards and Technology", National Institute of Standards and Technology, Sep. 2011, 7 pages.

Kandala et al., "Error Mitigation Extends the Computational reach of a noisy quantum processor", Nature, Mar. 28, 2019, vol. 567, 11 pages.

Ritter M. B., "Near-term Quantum Algorithms for Quantum Many-body Systems", Journal of Physics, 2019, vol. 1290, 7 pages.

Non-Final Office Action received for U.S. Appl. No. 17/095,030 dated Sep. 17, 2021, 48 pages.

Kandala et al., "Extending the Computational Reach of a Noisy Superconducting Quantum Processor", May 14, 2018, Cornell, URL: https://arxiv.org/abs/1805.04492, arXiv: 1805.04492 [ quant-ph], 10 pages.

Murali et al., "Noise-Adaptive Compiler Mappings for Noisy Intermediate-Scale Quantum Computers", Apr. 13-17, 2019, ASPLOS'19, Providence, RI, USA, URL: https://dl.acm.org/doi/pdf/10.1145/3297858.3304075, pp. 1015-1029.

List of IBM Patents or Applications Treated as Related.

International Search Report and Written Opinion received for PCT Application Serial No. PCT/EP2021/081161 dated Apr. 25, 2022, 18 pages.

Giurgica-Tiron et al., "Digital Zero Noise Extrapolation for Quantum Error Mitigation", 2020 IEEE International Conference on Quantum Computing and Engineering (QCE), May 21, 2020, pp. 306-316.

Lowe et al., "Unified Approach to Data-driven Quantum Error Mitigation", Physical Review Research, vol. 3, 2021, 12 pages.

Response to the Communication pursuant to Rule 161(1) and 162 EPC filed for European Patent Application Serial No. 21810326.5 dated Dec. 19, 2023, 15 pages.

Examination Report No. 1 for Standard Patent Application for Australian Application Serial No. 2021379051 dated Aug. 24, 2023.

* cited by examiner

STRETCH FACTOR ERROR MITIGATION ENABLED QUANTUM COMPUTERS

BACKGROUND

The subject disclosure relates to the use of stretch factors to implement error mitigation in quantum operations, and more specifically, to interpolating quantum gate parameters associated with a target stretch factor from reference models calibrated at a plurality of reference stretch factors.

Quantum computers produce noise that degrades the accuracy of quantum operations. Error mitigation techniques can account for the noise and improve the results of quantum computers. In conventional error mitigation techniques, a quantum operation is executed on a quantum circuit several times. In one or more of the quantum operation executions, the duration of the gates included in the quantum circuit can be stretched by a given factor, known as a stretch factor. By stretching the duration of the gates, additional noise can be introduced to the quantum operation executions. Thereby, the quantum computer can generate multiple result datasets, each with a respective amount of noise influenced by the employed stretch factor. An error mitigated result can then be extrapolated from the multiple result datasets. However, new gate parameters must be defined and calibrated for each respective stretch factor utilized in the quantum operation executions. Calibrating the gate parameters for each stretch factor requires scientists to access the hardware of the quantum computer and can be significantly time consuming. As such, conventional error mitigation techniques are limited by the calibration requirements.

Other conventional error mitigation techniques are implemented by replacing every two-qubit quantum gate by several copies of itself in the quantum circuit. For example, each two-qubit gate in a quantum circuit can be replaced by an odd number of two-qubits gates. However, these techniques neglect single-qubit gates and can correspond to long stretch factors that may be inappropriate for quantum circuits approaching the coherence limit. Moreover, an additional constraint to the conventional error mitigation techniques is that two sequential applications of the two-qubit gate must compose to the identity operation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate stretch factor error mitigation for quantum operations are described.

According to an embodiment, a system is provided. The system can comprise a memory that can store computer executable components. The system can also comprise a processor, operably coupled to the memory, and that can execute the computer executable components stored in the memory. The computer executable components can comprise an error mitigation component that can interpolate a gate parameter associated with a target stretch factor from a reference model that can include reference gate parameters for a quantum gate calibrated at a plurality of reference stretch factors. An advantage of such a system can be that the reference model can be employed to reduce calibration overhead.

In some examples, the system can comprise a model component that can define a plurality of reference stretch factors by determining a number of reference stretch factors within a stretch factor interval based on at least one of an error per gate determination and a gate parameter determination. An advantage of such a system can be that the reference model can include reference stretch factors associated with dynamic regions of a quantum gate calibration.

According to an embodiment, a system is provided. The system can comprise a memory that can store computer executable components. The system can also comprise a processor, operably coupled to the memory, and that can execute the computer executable components stored in the memory. The computer executable components can comprise a recommendation component that can identify a stretch factor for error mitigation of a quantum circuit based on a gate count and a qubit count of the quantum circuit. An advantage of such a system can be the enabled selection of stretch factors that are predicted to be most efficient in facilitating a Richardson error mitigation.

In some examples, the recommendation component can compare the gate count and the qubit count of the quantum circuit to a reference table that includes a range of stretch factors associated with defined gate and qubit count combinations. An advantage of such a system can be the recommendation of stretch factors based on past executions of similar quantum circuits.

According to an embodiment, a computer-implemented method is provided. The computer-implemented method can comprise interpolating, by a system operatively coupled to a processor, a gate parameter associated with a target stretch factor from a reference model that includes reference gate parameters for a quantum gate calibrated at a plurality of reference stretch factors. An advantage of such a computer-implemented method can be the determination of gate parameters for a target stretch factor without calibrating a quantum gate at the target stretch factor.

In some examples, the computer-implemented method can comprise determining, by the system, a number of reference stretch factors included within a stretch factor interval based on at least one of an error per gate determination and a gate parameter determination. An advantage of such a computer-implemented method can be the generation of a reference model that is highly calibrated at reference stretch factors associated with increased variation in the quantum gate's operation.

According to another embodiment, a computer-implemented method is provided. The computer-implemented method can comprise recommending, by a system operatively coupled to a processor, a stretch factor for error mitigation of a quantum circuit based on a gate count and a qubit count of the quantum circuit. An advantage of such a method can be the enablement of a user to effectively execute an error mitigation protocol with a desired stretch factor.

In some examples, the computer-implemented method can further comprise executing, by the system, a randomized benchmark operation that determines maximum stretch factors associated with a set of quantum gates. Also, the computer-implemented method can comprise monitoring, by the system, an availability of one or more quantum gates from the set of quantum gates. An advantage such a method can be that stretch factors can be adjusted and/or recommended to meet the capabilities of quantum hardware (e.g., the recent operating capability of a quantum gate).

According to an embodiment, a computer program product for quantum computer error mitigation is provided. The computer program product can comprise a computer readable storage medium having program instructions embodied therewith. The program instructions can be executable by a processor to cause the processor to generate, by the processor, a range of stretch factors associated with a quantum gate at a plurality of reference stretch factors. The program instructions can also cause the processor to receive, by the processor, a stretch factor from the range of stretch factors. Additionally, the program instructions can cause the processor to interpolate, by the processor, a gate parameter associated with the stretch factor based the plurality of reference stretch factors. An advantage of such a computer program product can be a reduction in calibration overhead of the quantum computer.

In some examples, the program instructions can further cause the processor to identify, by the processor, a recommended stretch factor from the range of stretch factors based on a gate count and a qubit count of a quantum circuit that includes the quantum gate. An advantage of such a computer program product can be an increased applicability of error mitigation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
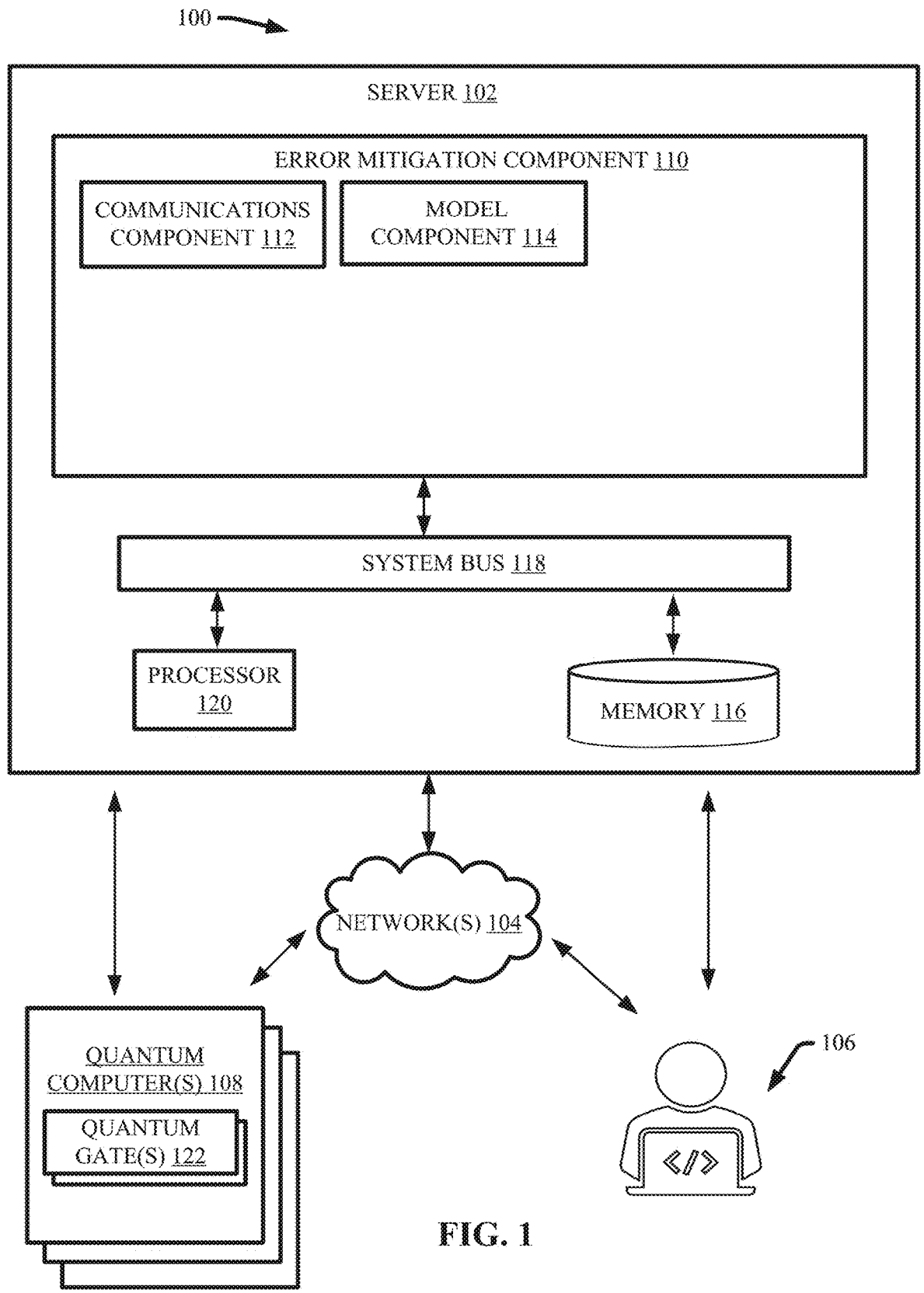
FIG. 1 illustrates a block diagram of an example, non-limiting system that can facilitate stretch factor error mitigation for one or more quantum operations in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of quantum computing error mitigation; the present disclosure can be implemented to produce a solution to one or more of these problems by interpolating quantum gate parameters from one or more reference models calibrated with regards to reference stretch factors. Advantageously, one or more embodiments described herein can implement error mitigation for an interval of stretch factors with minimum calibration overhead. Various embodiments described herein can enable the employment of one or more desired stretch factors from a given range characterized by a plurality of reference stretch factors.

Various embodiments of the present invention can be directed to computer processing systems, computer-implemented methods, apparatus and/or computer program products that facilitate the efficient, effective, and autonomous (e.g., without direct human guidance) stretched-pulse calibration and gate parameter interpolation. For example, in one or more embodiments described herein can calibrate a plurality of quantum gates with regards to reference stretch factors to generate a reference model. Further, various embodiments can interpolate gate parameters for a desired stretch factor from the reference model. Additionally, one or more embodiments described herein can recommend one or more stretch factors for use with a given quantum circuit. Moreover, one or more embodiments can adjust one or more selected stretch factors to enhance compatibility with the hardware of a given quantum computer.

The computer processing systems, computer-implemented methods, apparatus and/or computer program products employ hardware and/or software to solve problems that are highly technical in nature (e.g., quantum computing error mitigation), that are not abstract and cannot be performed as a set of mental acts by a human. For example, an individual, or a plurality of individuals, cannot generate reference models for stretch factor interpolation and error mitigation.

Also, one or more embodiments described herein can constitute a technical improvement over conventional error mitigation by interpolating quantum gate parameters from one or more reference models calibrated at a plurality of reference stretch factors. Additionally, various embodiments described herein can demonstrate a technical improvement over conventional error mitigation techniques by recommending stretch factors to be employed based on a given quantum circuit and/or hardware characteristics of a given quantum computer. Moreover, various embodiments described herein can demonstrate a technical improvement over conventional error mitigation techniques by enabling the selection of one or more stretch factors within a given range while minimizing calibration overhead.

Further, one or more embodiments described herein can have a practical application by mitigating errors in one or more quantum operations. For instance, various embodiments described herein can interpolate quantum gate parameters from a reference model; thereby enabling the selection of one or more desired stretch factors from a given range without being inhibited by restrictions associated with calibrating quantum gates. Further, one or more embodiments described herein can control a recommendation component to analyze a given quantum circuit and/or generate one or more recommended stretch factors to be employed for error mitigation. Thereby, the one or more embodiments can enable a user to employ stretch factors that are compatible with a desired quantum circuit.

FIG. 1 illustrates a block diagram of an example, non-limiting system 100 that can facilitate quantum computing error mitigation. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines (e.g., computers, computing devices, virtual machines, and/or the like) can cause the machines to perform the operations described.

As shown in FIG. 1, the system 100 can comprise one or more servers 102, one or more networks 104, input devices 106, and/or quantum computers 108. The server 102 can comprise error mitigation component 110. The error mitigation component 110 can further comprise communications component 112 and/or model component 114. Also, the server 102 can comprise or otherwise be associated with at least one memory 116. The server 102 can further comprise a system bus 118 that can couple to various components such as, but not limited to, the error mitigation component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the error mitigation component 110 can be provided on the one or more servers 102, it should be appreciated that the architecture of system 100 is not so limited. For example, the error mitigation component 110, or one or more components of error mitigation component 110, can be located at another computer device, such as another server device, a client device, a combination thereof, and/or the like.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more quantum circuits and/or target stretch factors into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In various embodiments, the one or more quantum computers 108 can comprise quantum hardware devices that can utilize the laws of quantum mechanics (e.g., such as superposition and/or quantum entanglement) to facilitate computational processing (e.g., while satisfying the DiVincenzo criteria). In one or more embodiments, the one or more quantum computers 108 can comprise a quantum data plane, a control processor plane, a control and measurement plane, and/or a qubit technology.

In one or more embodiments, the quantum data plane can include one or more quantum circuits comprising physical qubits, structures to secure the positioning of the qubits, and/or support circuitry. The support circuitry can, for example, facilitate measurement of the qubits' state and/or perform gate operations on the qubits (e.g., for a gate-based system). In some embodiments, the support circuitry can comprise a wiring network that can enable multiple qubits to interact with each other. Further, the wiring network can facilitate the transmission of control signals via a direct electrical connection and/or electromagnetic radiation (e.g., optical, microwave, and/or low-frequency signals). For instance, the support circuitry can comprise one or more superconducting resonators operatively coupled to the one or more qubits. As described herein the term "superconducting" can characterize a material that exhibits superconducting properties at or below a superconducting critical temperature, such as aluminum (e.g., superconducting critical temperature of 1.2 Kelvin) or niobium (e.g., superconducting critical temperature of 9.3 Kelvin). Additionally, one of ordinary skill in the art will recognize that other superconductor materials (e.g., hydride superconductors, such as lithium/magnesium hydride alloys) can be used in the various embodiments described herein.

In one or more embodiments, the control processor plane can identify and/or trigger a Hamiltonian sequence of quantum gate operations and/or measurements, wherein the sequence executes a program (e.g., provided by a host processor, such as server 102 and/or the one or more input devices 106) for implementing a quantum algorithm. For example, the control processor plane can convert compiled code to commands for the control and measurement plane. In one or more embodiments, the control processor plane can further execute one or more quantum error correction algorithms.

In one or more embodiments, the control and measurement plane can convert digital signals generated by the control processor plane, which can delineate quantum operations to be performed, into analog control signals to perform the operations on the one or more qubits in the quantum data plane. Also, the control and measurement plane can convert one or more analog measurement outputs of the qubits in the data plane to classical binary data that can be shared with other components of the system 100 (e.g., such as the error mitigation component 110, via, for example, the control processor plane).

One of ordinary skill in the art will recognize that a variety of qubit technologies can provide the basis for the one or more qubits of the one or more quantum computers 108. Two exemplary qubit technologies can include trapped ion qubits and/or superconducting qubits. For instance, wherein the quantum computer 108 utilizes trapped ion qubits, the quantum data plane can comprise a plurality of ions serving as qubits and one or more traps that serve to hold the ions in specific locations. Further, the control and measurement plane can include: a laser or microwave source directed at one or more of the ions to affect the ion's quantum state, a laser to cool and/or enable measurement of the ions, and/or one or more photon detectors to measure the state of the ions. In another instance, superconducting qubits (e.g., such as superconducting quantum interference devices "SQUIDs") can be lithographically defined electronic circuits that can be cooled to milli-Kelvin temperatures to exhibit quantized energy levels (e.g., due to quantized states of electronic charge or magnetic flux). Superconducting qubits can be Josephson junction-based, such as transmon qubits and/or the like. Also, superconducting qubits can be compatible with microwave control electronics, and can be utilized with gate-based technology or integrated cryogenic controls. Additional exemplary qubit technologies can include, but are not limited to: photonic qubits, quantum dot qubits, gate-based neutral atom qubits, semiconductor qubits (e.g., optically gated or electrically gated), topological qubits, a combination thereof, and/or the like.

In various embodiments, the one or more quantum computers 108 can comprise one or more quantum gates 122. The one or more quantum gates 122 can operably couple multiple qubits of the one or more quantum computers 108. The one or more quantum computers 108 can execute one or more quantum operations by controlling one or more of the quantum gates 122 in accordance with one or more given quantum circuits. In various embodiments, the one or more quantum gates 122 can be any type of quantum gate 122 in which the pulse that implements the gate can be stretched. Example types of gates that can be included within the one or more quantum gates 122 can include, but are not limited to: cross-resonance gates, single-qubit gates, multi-qubit gates, a combination thereof, and/or the like.

In one or more embodiments, the communications component 112 can receive one or more Hamiltonians, quantum circuits, and/or target stretch factors from the one or more input devices 106 (e.g., via a direct electrical connection and/or through the one or more networks 104) and share the data with the various associate components of the error mitigation component 110. Additionally, the communications component 112 can facilitate the sharing of data between the error mitigation component 110 and the one or more quantum computers 108, and/or vice versa (e.g., via a direct electrical connection and/or through the one or more networks 104).

A time-dependent drive Hamiltonian can be characterized by Equation 1 below:

$$K(t)=\Sigma_\alpha J_\alpha(t) P_\alpha \qquad (1)$$

Where "$\Sigma_\alpha$" can represent sum over the index alpha, and "$J_\alpha$" can represent a time-dependent strength of the interaction associated with "$P_\alpha$". Further, where "$P_\alpha$" is a N-qubit Pauli operator, subject to time-invariant noise "$\lambda$", an expectation value of an observable "$E_K(\lambda)$" after evolution under a scaled drive "$K^j(t)=\Sigma_\alpha J_\alpha^j(t) P_\alpha$" for a time "$c_j T$" is equivalent to a measurement under an amplified noise strength "$c_j \lambda$". Thus, the observable associated with several different observables "$c_j$" can be calculated (e.g., via the one or more quantum computers 108) and $E_K(\lambda)$ can be extrapolated back to the zero-noise limit "E*". In various embodiments, the one or more quantum computers 108 can make available a calibrated quantum gate set for each employed stretch factor, which can depend on one or more characteristics of a given quantum circuit employed for the given quantum operation (e.g., execution of a given quantum algorithm).

In various embodiments, the model component 114 can reduce calibration overhead associated with implementing the various stretch factors by generating one or more reference models from which gate parameters for target stretch factors can be interpolated. For example, one or more reference models generated by the model component 114 can relate quantum gate parameters of the one or more quantum computers 108 to their effect on the unitary time evolution. In various embodiments, the model component 114 can generate the one or more reference models based on analytical considerations and/or empirical measurements. Example gate parameters that can be interpolated from the one or more reference models can include, but are not limited to: amplitude of a cross-resonance pulse, phase of a cross-resonance pulse, derivative removal by adiabatic gate ("DRAG") value (e.g., the DRAG coefficient of a single-qubit pulse), amplitude of a single-qubit pulse, a combination thereof, and/or the like.

For example, the amplitude "$\Omega$" of a cross-resonance pulse of a duration "T" can be related to the ZX rotation (e.g., characterized by $\theta_{ZX}=\omega_{ZX}T$) by a third order model in accordance with Equation 2 below.

$$\frac{\omega_{ZX}(\Omega)}{2} = -\frac{J\Omega}{\Delta}\left(\frac{\delta_1}{\delta_1+\Delta}\right) + \frac{J\Omega^3\delta_1^2(3\delta_1^3+11\delta_1^2\Delta+15\delta_1\Delta^2+9\Delta^3)}{4\Delta^3(\delta_1+\Delta)^3(\delta_1+2\Delta)(3\delta_1+2\Delta)} \quad (2)$$

Where "$\delta_1$" can represent the anharmonicity of a control qubit of the one or more quantum computers 108, "$\Delta$" can represent a frequency difference between the control qubit and target qubits of the one or more quantum computers 108, and/or "J" can represent a coupling strength between the qubits.

The one or more reference models can regard a continuous interval of stretch factors (e.g., characterized by "$c_j \in [c_{min}, c_{max}]$") that includes a plurality of reference stretch factors. In various embodiments, each of the quantum gates 122 of the one or more quantum computers 108 can be calibrated with regards to each of the reference stretch factors. Further, the calibrated gate parameters can be plotted against the reference stretch factors within the one or more reference models. Thereby, the model component 114 can employ one or more empirical fittings on the plotted data to characterize a relationship between the parameter values and the reference stretch factors for each of the quantum gates 122 of the one or more quantum computers 108.

Figure 2:
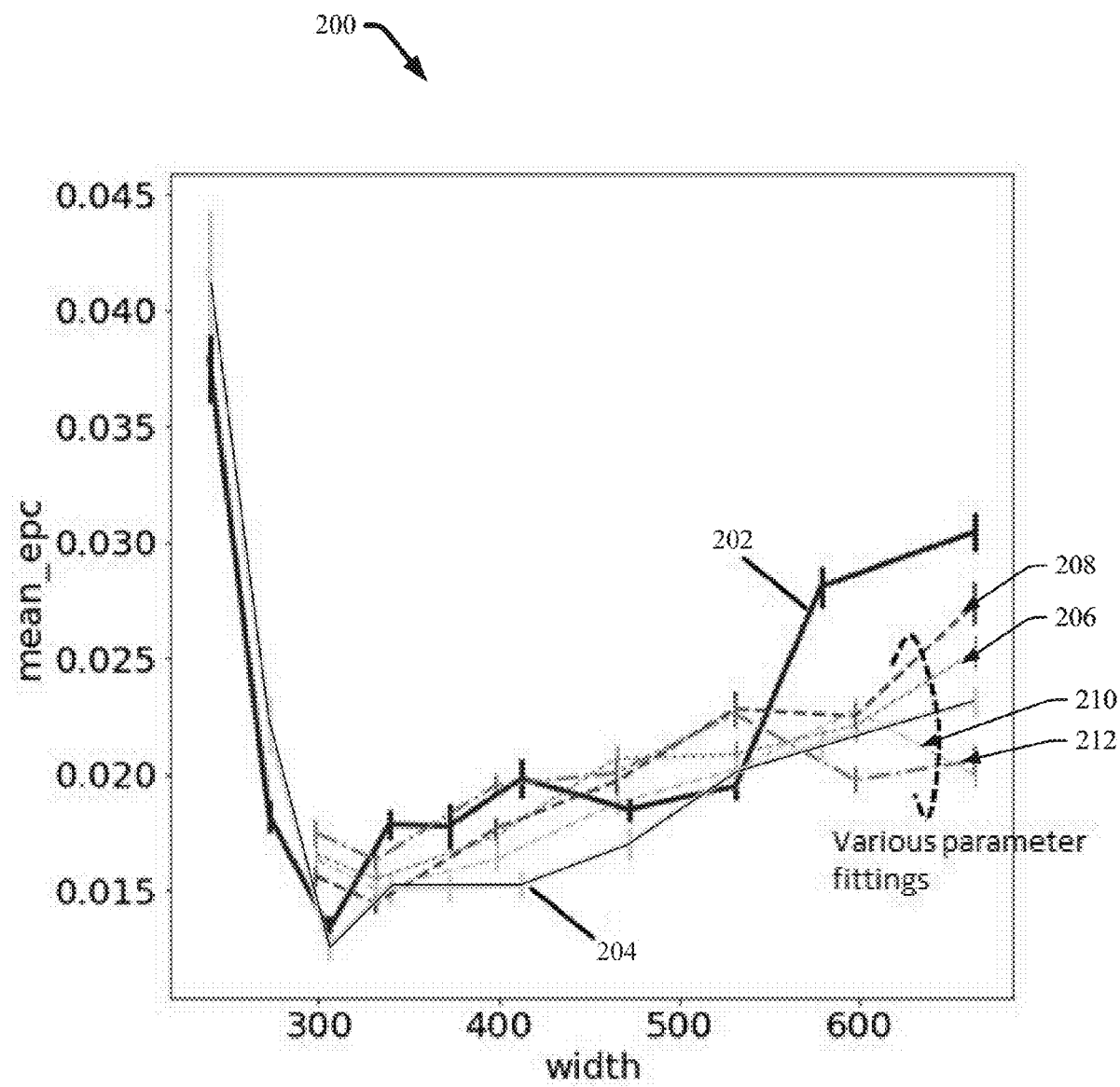
FIG. 2 illustrates a diagram of an example, non-limiting graph that can characterize error-per-Clifford variations that can influence the number of reference stretch factors employed within a stretch factor interval in accordance with one or more embodiments described herein.

FIG. 2 illustrates a diagram of an example, non-limiting graph 200 depicting various empirical fittings that can be employed by the model component 114 to generate one or more reference models that characterize a relationship between gate parameters and stretch factors in accordance with one or more embodiments described herein. Repetitive description of like elements employed in other embodiments described herein is omitted for sake of brevity. In various embodiments, the model component 114 can fit the amplitude parameter of a given quantum gate 122 to the calibrated reference stretch factor data. Further, as shown in graph 200, the model component 114 can fit the angle and/or delta parameters of a given quantum gate 122 to the calibrated reference stretch factor data using polynomial and/or piece-wise linear fits. The reference model exemplified by graph 200 can regard calibrations for a stretch factor interval ranging between 1 and 2.

As shown in FIG. 2, line 202 can represent an initial stretch factor calibration performed for a quantum gate 122 (e.g., a cross-resonance gate). Line 204 can represent a subsequent second stretch factor calibration performed for the quantum gate 122. Line 206 can represent a piece-wise linear fitting using the parameters resulting from the initial stretch factor calibration. Line 208 can represent a piece-wise linear fitting using the parameters resulting from the second stretch factor calibration. Line 210 can represent a polynomial fitting u sing the parameters resulting from the initial stretch factor calibration. Line 212 can represent a polynomial fitting using the parameters resulting from the second stretch factor calibration. In various embodiments a fitting of the amplitude parameter utilizing $\theta_{ZX}=\omega_{ZX}T$ (e.g., inversely proportional to time) can be less sensitive than fittings for other gate parameters, such as phase and/or DRAG parameters.

In various embodiments, the model component 114 can determine the stretch factor interval associated with each quantum gate based on one or more operating characteristics of the quantum gates 122 of the one or more quantum computers 108. For example, the model component 114 can determine the stretch factor interval such that a minimal amount of calibration overhead is necessitated while still producing quantum gates 122 for error mitigation (e.g., for Richardson error mitigation). For instance, the model component 114 can determine the number of stretch factors to serve as reference stretch factors for the quantum gate 122 and/or which stretch factors to serve as reference stretch factors based variations in the error per Clifford value and/or parameter value for the given quantum gate 122.

For example, the model component 114 can define the number and/or value of the reference stretch factors included within the stretch factor interval based on an error per gate (e.g., error per Clifford) determination. For instance, the number of reference stretch factors included within the stretch factor interval can increase with a number of variations in an error per gate (e.g., error per Clifford) determination within the stretch factor interval. In another example, the model component 114 can define number and/or value of the reference stretch factors included within the stretch factor interval based on the gate parameters. For instance, the number of reference stretch factors included within the stretch factor interval can increase with a number of variations in the gate parameter determination within the stretch factor interval.

Figure 3A:
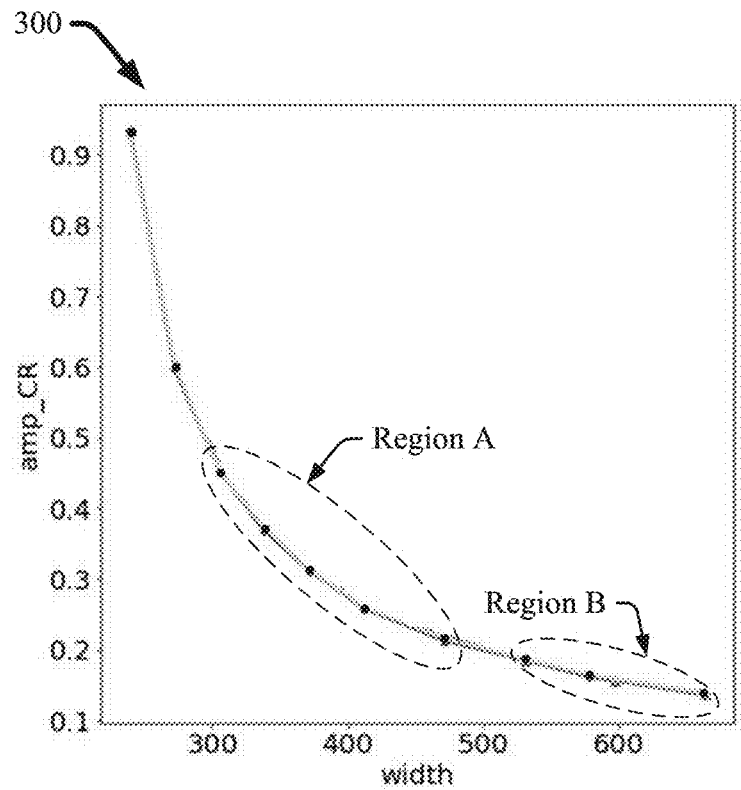
FIG. 3A illustrates a diagram of an example, non-limiting graph that can characterize gate parameter variations that can influence the number of reference stretch factors employed within a stretch factor interval in accordance with one or more embodiments described herein.
Figure 3B:
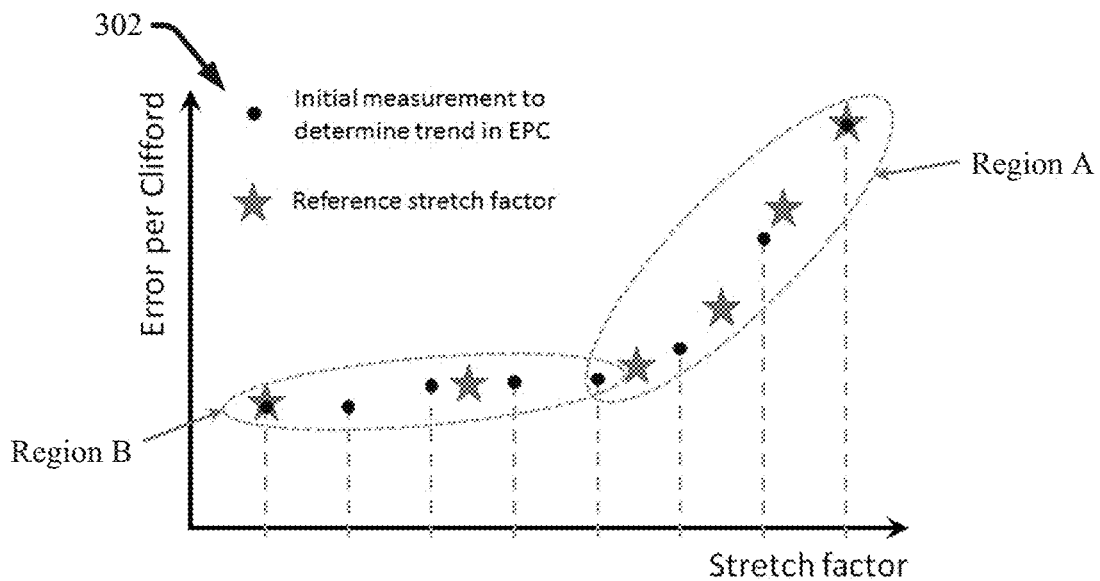
FIG. 3B illustrates a diagram of an example, non-limiting graph that can characterize error per Clifford variations that can influence the number of reference stretch factors employed within a stretch factor interval in accordance with one or more embodiments described herein.

FIGS. 3A-B illustrate diagrams of example, non-limiting graphs 300 and/or 302 that can be generated by the model component 114 to characterize one or more operating characteristics of the one or more quantum gates 122 and identify reference stretch factors in accordance with one or more embodiments described herein. Repetitive description of like elements employed in other embodiments described herein is omitted for sake of brevity. In one or more embodiments, graph 300 and/or 302 can be generated by the model component 114 based on one or more analytical considerations (e.g., in accordance with Equation 2) for the quantum gates 122 of the one or more quantum computers 108. As shown in FIG. 3A, exemplary graph 300 can regard the amplitude of a cross-resonance pulse (e.g., referenced as "amp_CR" in FIG. 3A) as the gate parameter of interest for the reference modeling. As shown in FIG. 3B, the model component 114 can generate exemplary graph 302 by first estimating how the error per Clifford value varies as a function of the stretch factor value. For instance, the model component 114 can perform a first estimation where the error per Clifford is determined for a set of typically linearly spaced stretch factors in the stretch factor interval. Next, the model component 114 can select reference stretch factors based on the amount of variation between error per Clifford values.

In region A of the exemplary graphs 300, 302, the given quantum gate 122 can experience a greater amount of variation in the gate parameter and/or error per Clifford values than in region B. For example, the difference between gate parameter values and/or error per Clifford values from one reference point to another within region A can be greater than the difference between gate parameter values and/or error per Clifford values from one reference to another within region B. For instance, the slope of an empirical fitting characterizing the change in amplitude and/or error per Clifford value can be greater within region A than region B.

In various embodiments, the model component 114 can define the number of reference stretch factors included within region A to be greater than the number of reference stretch factors included within region B. For instance, the model component 114 can identify 5 reference stretch factors corresponding to region A and 3 reference stretch factors corresponding to region B, as shown in FIG. 3A. In another instance, the model component 114 can identify 4 reference stretch factors corresponding to region A and 2 reference stretch factors corresponding to region B, as shown in FIG. 3B. Thereby, the density of reference stretch factors associated with region A can be greater than the density of reference stretch factors associated with region B.

In one or more embodiments, the error mitigation component 110 can share the reference stretch factor values determined by the model component 114 with one or more data scientists via one or more input devices 106. Thereby, the data scientists can calibrate the quantum gates 122 of the one or more quantum computers 108 for the reference stretch factors. As a result of the calibration, reference gate parameters associated with the reference stretch factors can be determined. For example, the reference gate parameters for a given quantum gate can be the gate parameters that achieve the reference stretch factors in accordance with the calibration. Further, one or more of the input devices 106 can be employed to enter the reference gate parameters into the system 100 and share the reference gate parameters with the error mitigation component 110. In accordance with various embodiments described herein, the model component 114 can plot the reference gate parameters versus the reference stretch factors and employ an empirical fitting (e.g., piecewise linear fitting, polynomial fitting) to generate the one or more reference models.

In one or more embodiments, the error mitigation component 110 can share the reference stretch factor values determined by the model component 114 with the one or more input devices 106 and/or quantum computers 108 to facilitate an automated calibration of the one or more quantum gates 122. For example, the calibration can execute a plurality of calibration routines that execute operations of the one or more quantum computers 108 to determine the values of the gate parameters of the associate pulse. Each calibration routine can also return a precision associated to the gate parameter of the associate pulse targeted for calibration. Thereby, the automated calibration can determine if it can execute the next calibration routine or if the last calibration routine needs to be repeated.

Figure 4:
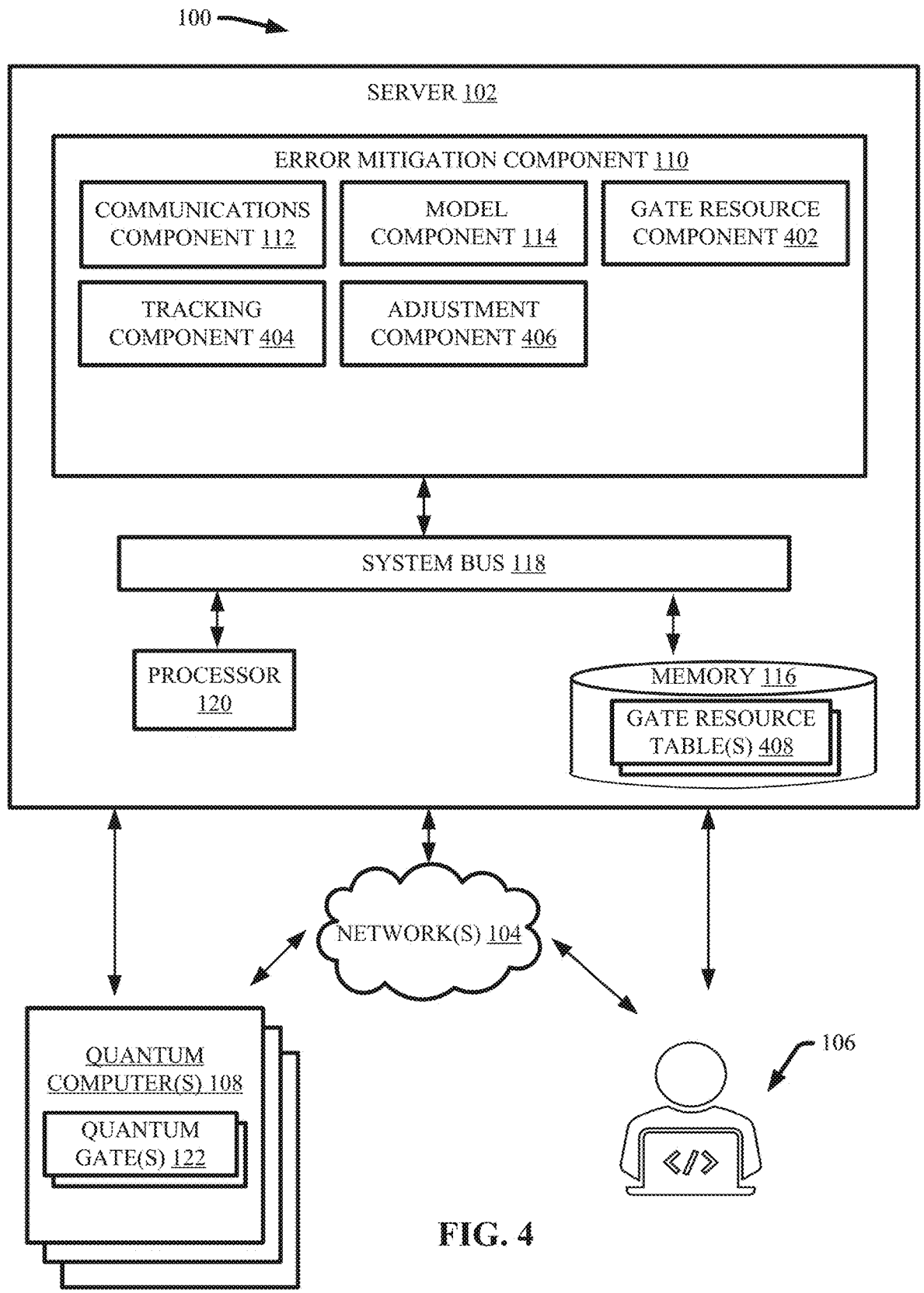
FIG. 4 illustrates a block diagram of an example, non-limiting system that can determine and/or track the maximum stretch factors associated with one or more gates employed by a quantum computer in accordance with one or more embodiments described herein.

FIG. 4 illustrates a diagram of the example, non-limiting system 100 further comprising gate resource component 402, tracking component 404, and/or adjustment component 406 in accordance with one or more embodiments described herein. Repetitive description of like elements employed in other embodiments described herein is omitted for sake of brevity. In various embodiments, the gate resource component 402 can define one or more operating capabilities of the one or more quantum gates 122 of the quantum computers 108. Also, the tracking component 404 can track the operating capabilities defined by the gate resource component 402 to identify if one or more changes have occurred. Further, the adjustment component 406 can modify one or more target stretch factors to accommodate the operating capabilities defined by the gate resource component 402 and tracked by the tracking component 404.

The one or more quantum gates 122 (e.g., cross-resonance gates) of the quantum computers 108 can be initially optimized having different gate lengths and gate errors. Therefore, the maximum stretch factors that can be employed with respective quantum gates can vary. For example, a first quantum gate 122 of the quantum computers 108 can successfully employ a maximum stretch factor of two; whereas a second quantum gate 122 of the quantum computers 108 can fail at a stretch factor of two.

In various embodiments, the gate resource component 402 can generate one or more gate resource tables 408. For example, each quantum gate 122 of the one or more quantum computers 108 can be represented in the one or more gate resource tables 408. Further, the gate resource component 402 can populate the gate resource tables 408 with the minimum and maximum stretch factors that can be employed with each quantum gate 122. For instance, the one or more gate resource tables 408 can represent each quantum gate 122 by respective identifiers (e.g., titles and/or numbers) and can list the minimum and maximum stretch factor value associated with each quantum gate 122. In various embodiments, the number, position, and/or composition of the quantum gates 122 can be entered into the system 100 by one or more data scientists and/or computer programs familiar with the quantum computers 108 via one or more input devices 106. In some embodiments, the gate resource component 402 can retrieve data defining the number, position, and/or composition of the quantum gates 122 from the one or more quantum computers 108. In one or more embodiments, the quantum gates 122 can, for example, be identified by name and stretch factor (e.g., the stretch factor can be incorporated into the quantum gate 122 name). For instance, exemplary quantum gate 122 names can include, but are not limited to: CNOT_1.00 (e.g., where the stretch factor is 1.00), CNOT_1.50 (e.g., where the stretch factor is 1.50), and/or CNOT_2.00 (e.g., where the stretch factor is 2.00). In various embodiments, the one or more gate resource tables 408 can be stored within the one or more memories 116. In one or more embodiments, the one or more gate resource tables 408 can be stored in a computer architecture outside the server 102. In some embodiments, the one or more quantum gates 122 can further be grouped into sets, known as families, within the one or more gate resource tables 408 based on function and/or proximity to each other within the one or more quantum computers 108.

The minimum and/or maximum stretch factors associated with a quantum gate 122 can be computed by the gate resource component 402 based on one or more analytical considerations and/or one or more measurements. For example, in various embodiments one or more input devices 106 can be employed to enter hardware characteristics of the quantum gates 122 into the system 100. Example hardware characteristics can include, but are not limited to: the material composition of the quantum gates 122, the connectivity of the quantum gates 122, the length of the quantum gates 122, fidelity of the quantum gates 122, fluctuations of the fidelity of the quantum gates 122, a combination thereof, and/or the like. For instance, the maximum stretch factor for a given quantum gate 122 can define the stretch factor value beyond which the quantum gate 122 would be too unstable for use or would experience too much error for use. Based on the hardware characteristics, the gate resource component 402 can compute the minimum and/or maximum stretch factors that can be employed with the quantum gates in accordance with a numerical model of the quantum system based on the hardware characteristics of the one or more quantum computers 108. In another example, the quantum gates 122 can be operated with a plurality of stretch factors of increasing value to identify the minimum and/or maximum stretch factor values that can achieve successful operation, where the one or more quantum computers 108 can share the identified minimum and/or maximum stretch factors with the gate resource component 402 (e.g., via the one or more networks 104).

In various embodiments, the one or more quantum gates 122 can be susceptible to operating fluctuations. As a result of the fluctuations, the maximum stretch factor employable by a quantum gate 122 can change over time. The tracking component 404 can track the operating condition of the one or more quantum gates 122 to ensure that the maximum stretch factors reflected in the one or more gate resource tables 408 are up to date. For example, the tracking component 404 can perform one or more randomized benchmarking protocols to assess the capabilities of the quantum computers' 108 hardware by estimating average error rates measured under the implementation of sequences of random quantum gate operations. For instance, the randomized benchmarking can be based on uniformly random Clifford operations. Additionally, quantum process tomography ("QPT") and/or quantum gate set tomography ("GST") can be implemented (e.g., via tracking component 404) to determine the maximum stretch factor values (e.g., based on the fidelity of the quantum gates 122). Where a randomized benchmarking protocol is employed, a plurality of sequences of Clifford gates can be created with a number "m" of Clifford gates. In any given Clifford gate sequence of length m, the Clifford gates of 1 to m−1 can be chosen at random from the Clifford group. The last Clifford gate can be chosen such that the sequence of m Clifford gates composes to the identity operation. The measurements at each length m can be averaged to create a curve that shows qubit population as a function of m. Further, gate fidelity can be extracted from the curve with an empirical fitting.

In one or more embodiments, the tracking component 404 can implement the randomized benchmarking protocol periodically to validate the maximum stretch factors included in the one or more gate resource tables 408. For example, the tracking component 404 can implement the randomized benchmarking protocol in accordance with one or more schedules. For instance, the tracking component 404 can implement the randomized benchmarking protocol daily, on an interval of days (e.g., every two days), weekly, and/or another desirable interval of time. Further, the randomized benchmarking schedule implemented by the tracking component 404 can vary between the quantum gates 122. For example, quantum gates associated with the highest maximum stretch factors can be gates most suspectable to gate fluctuations and as such can be subject to randomized benchmarking by the tracking component 404 more frequently than quantum gates associated with lower maximum stretch factors. For instance, quantum gates associated with the highest maximum stretch factors can be subjected to randomized benchmarking by the tracking component 404 on a daily basis; while quantum gates associated with the lower maximum stretch factors can be subjected to randomized benchmarking by the tracking component 404 on a weekly basis. In various embodiments, the randomized benchmarking schedule implemented by the tracking component 404 can vary based on the amount of maintenance overhead budgeted for the system 100 and/or quantum computers 108.

In one or more embodiments, the adjustment component 406 can reference the one or more gate resource tables 408 (e.g., generated by the gate resource component 402 and/or updated by the tracking component 404) to determine whether one or more target stretch factors should be modified to meet the capacities of the available quantum gates 122. For example, the one or more input devices 106 can be employed to define one or more quantum circuits to be executed during one or more quantum operations by the one or more quantum computers 108. Where error mitigation is employed to enhance the results of the quantum operations, the one or more input devices 106 can also be employed to define one or more target stretch factors to be utilized during the error mitigation protocol.

The adjustment component 406 can analyze the received quantum circuit (e.g., received via the one or more networks 104 and/or communication component 112) to identify which quantum gates 122 from the one or more quantum computers 108 will be operating during the quantum operation. For example, the adjustment component 406 can correlate quantum gates 122 of the quantum computers 108 to the given quantum circuit based on qubit connectivity established by the quantum gates and delineated by the quantum circuit. In another example, each quantum gate 122 of the given quantum circuit must be executed by the one or more quantum computers 108. If the given quantum circuit contains a quantum gate 122 that is not natively supported by the quantum computer 108, then the quantum gate 122 can be decomposed into quantum gates 122 that are natively supported. For instance, if the given quantum circuit delineates a quantum gate 122 that is not supported by the one or more quantum computers 108 due to limited qubit connectivity, then swap gates (e.g., decomposed into gates supported by the quantum computer 108) can be inserted into the quantum circuit by the adjustment component 406. Thereby, the adjustment component 406 can identify the relevant quantum gates 122 for the quantum operation and can reference the one or more gate resource tables 408 to identify the range of permissible stretch factors (e.g., as limited by the maximum stretch factor) that can be utilized with the relevant quantum gates 122. Where the one or more target stretch factors provided via the input devices 106 are within the range of permissible stretch factors, the error mitigation component 110 can proceed with implementing one or more error mitigation protocols described herein with the given target stretch factors. Where the one or more stretch factors provided via the input devices 106 are outside the range of permissible stretch factors, the adjustment component 406 can alter the value of the target stretch factors to one or more values within the permissible range. For instance, the adjustment component 406 can alter the value of the one or more target stretch factors to a value within the permissible range that is closest to the initially provided value. In another instance, the adjustment component 406 can alter the value of the one or more target stretch factors to a value within the center of the permissible range.

In various embodiments, one or more stretch factors within the permissible range can still be inoperable. Inoperable stretch factors within the permissible range can be reflected by a performance benchmark, such as a high error per Clifford value. For instance, an exemplary permissible stretch factor range can be from 1.0 to 3.0. However, stretch factors 2.1 to 2.3 can be inoperable stretch factors due to poor fidelity (e.g., the one or more calibration protocols could have been ineffective for these stretch factors). The adjustment component 406 can ensure that target stretch factors are not within the 2.1 to 2.3 range.

Additionally, the adjustment component 406 can alter target stretch factors to satisfy one or more hardware constraints. For example, some quantum computer 108 hardware can only load pulses that have a multiple of a defined number of samples (e.g., can only load pulses that are a multiple of 16 samples). The adjustment component 406 can choose to alter the target stretch factors such that the pulses are multiples of the defined number for the quantum computer 108 hardware. For example, where the defined number is 16; if a pulse with a stretch factor of 2.1 has 168 samples, then the adjustment component 406 can elect to use a target stretch factor of 2 so that the pulse has 160 samples (which is a multiple of 16).

To exemplify a non-limiting embodiment of how the gate resource component 402, tracking component 404, and/or adjustment component 406 can operate in conjunction, the following exemplary use case is considered. A quantum gate 122 of the one or more quantum computers 108 can be initially optimized such that stretch factors ranging from greater than or equal to 1.0 and less than or equal to 2.0 can be successfully employed in one or more error mitigation protocols. The gate resource component 402 can store the permissible stretch factor range (e.g., 1.0 to 2.0) within the one or more gate resource tables 408 in association with the quantum gate's 122 unique identifier. Subsequent to the initial optimization, the quantum gate 122 can experience one or more operating fluctuations resulting in a narrowing of the permissible stretch factor range to a new range that is greater than or equal to 1.0 and less than or equal to 1.8. For example, the qubit coherence times T1 and T2 can fluctuate in the one or more quantum computers 108, which can negatively affect quantum gates 122 employing large stretch factors. During a randomized benchmarking protocol performed by the tracking component 404 in accordance with one or more defined schedules, the tracking component 404 can identify the narrowed range and update the one or more gate resource tables 408 accordingly. Prior to execution, by the one or more quantum computers 108, of a quantum operation utilizing the quantum gate 122; the adjustment component 406 can compare one or more target stretch factors, given in association with the quantum operation, with the permission stretch factor range (e.g., 1.0 to 1.8) stored in the one or more gate reference tables 408. Where the target stretch factor is greater than 1.8, the adjustment component 406 can alter the value of the target stretch factor to 1.8 to meet the capacities of the quantum gate 122.

Figure 5:
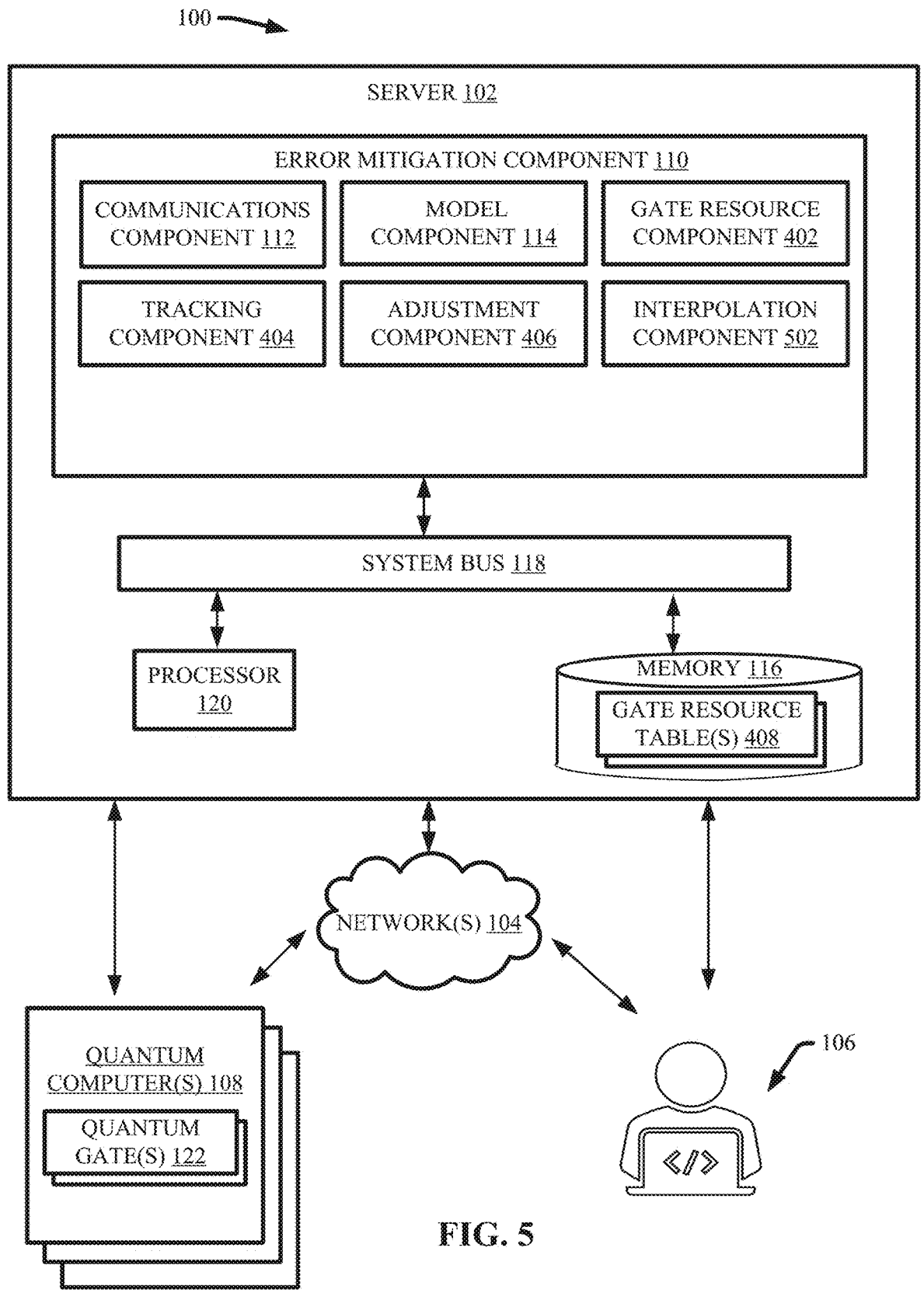
FIG. 5 illustrates a block diagram of an example, non-limiting system that can interpolate one or more gate parameters for a quantum gate calibrated at a plurality of reference stretch factors in accordance with one or more embodiments described herein.

FIG. 5 illustrates a diagram of the example, non-limiting system 100 further comprising interpolation component 502 in accordance with one or more embodiments described herein. Repetitive description of like elements employed in other embodiments described herein is omitted for sake of brevity. In various embodiments, the interpolation component 502 can determine one or more quantum gate parameters that can achieve target stretch factors (e.g., provided by one or more input devices 106 and/or altered by the adjustment component 406) for a given quantum gate 122 based on the one or more reference models generated by the model component 114.

In one or more embodiments, the interpolation component 502 can interpolate gate parameters for a target stretch factor based on nearby reference gate parameters calibrated with regards to the reference stretch factors. As described herein, the one or more reference models generated by the model component 114 can plot reference stretch factors versus reference gate parameters (e.g., determine via one or more calibration protocols) and include an empirical fitting to the plotted data. The interpolation component 502 can further interpolate gate parameters from the empirical fitting for one or more target stretch factors. Thereby, the interpolation component 502 can interpolate gate parameters from the reference model for a stretch factor that has not been otherwise calibrated (e.g., a non-reference stretch factor).

Figure 6:
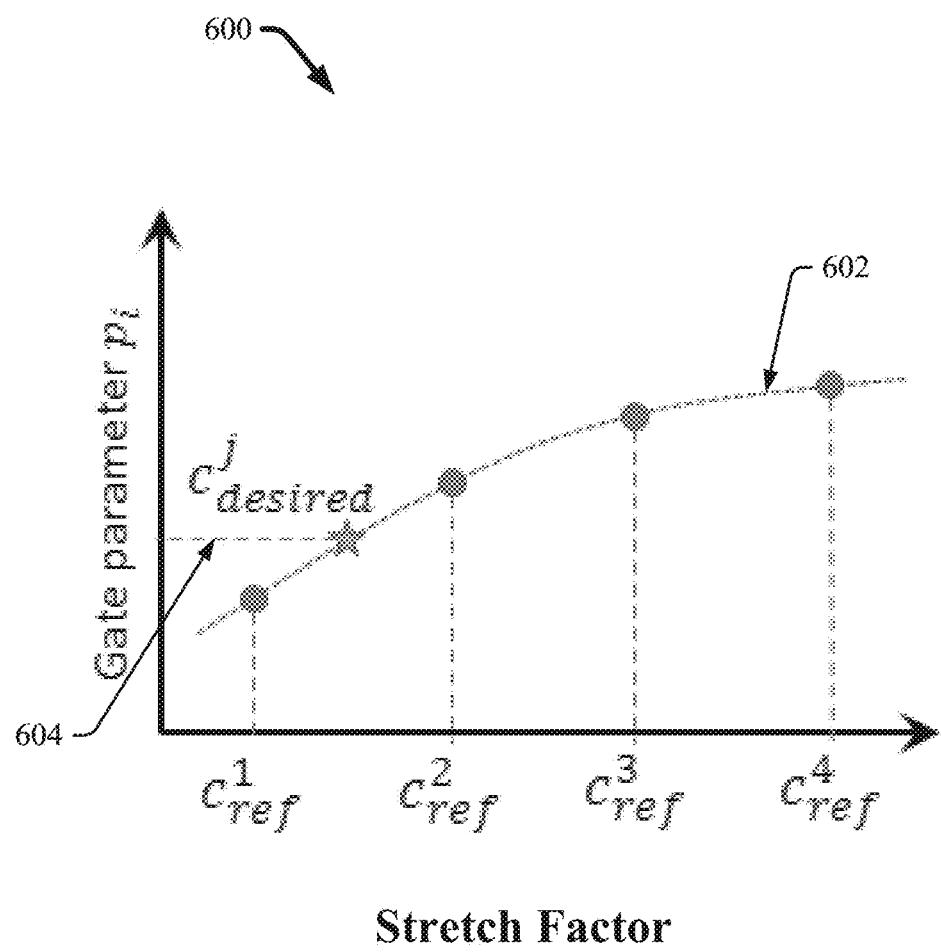
FIG. 6 illustrates a diagram of an example, non-limiting reference model that can characterize one or more quantum gate parameters associated with a plurality of reference stretch factors in accordance with one or more embodiments described herein.

FIG. 6 illustrates a diagram of an example, non-limiting reference model 600 that can depict a gate parameter interpolation that can be executed by the interpolation component 502 in accordance with one or more embodiments described herein. Repetitive description of like elements employed in other embodiments described herein is omitted for sake of brevity. The exemplary reference model 600 can be generated by the model component 114 in accordance with the various embodiments described herein.

As shown in FIG. 6, the exemplary reference model 600 can plot four reference stretch factors (e.g., represented by "$c_{ref}^1$", "$c_{ref}^2$", "$c_{ref}^3$", and "$c_{ref}^4$") versus a gate parameter "$p_i$" (e.g., amplitude of a cross-resonance pulse). As described herein, the four reference stretch factors can be identified by the model component 114 based on the severity of variations in error per Clifford calculations and/or the severity of variation in the gate parameters (e.g., the density of reference stretch factors can increase as the slope of the empirical fit increases). Further, the quantum gate can be calibrated at the reference stretch factors to determine the gate parameter value associated with each reference stretch factor (e.g., the reference gate parameters).

Thereby the interpolation component 502 can interpolate the gate parameter associated with a target stretch factor by locating position of the target stretch factor on the fitted model and referencing the gate parameter value corresponding to the position. For example, the position of a target stretch factor "$c_{desired}^j$" on an empirical fitting 602 of the calibrated reference stretch factor data can be represented by a star in FIG. 6. As illustrated by dotted line 604, the gate parameter value associated with the target stretch factor "$c_{desired}^j$" can be interpolated from the empirical fitting 602.

Figure 7:
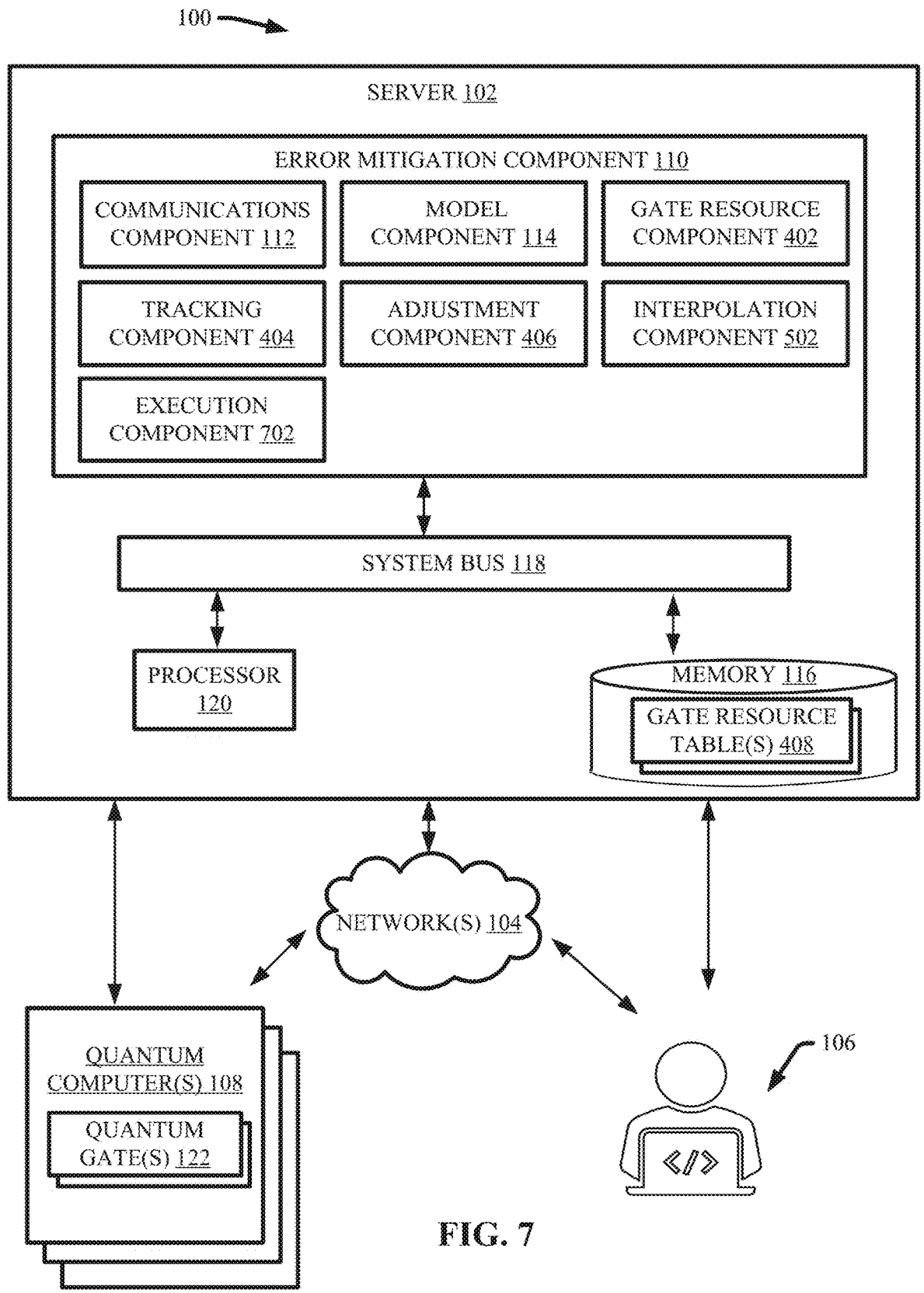
FIG. 7 illustrates a block diagram of an example, non-limiting system that can execute one or more quantum operations on one or more quantum computers based on one or more stretch factor schedules in accordance with one or more embodiments described herein.

FIG. 7 illustrates a diagram of the example, non-limiting system 100 further comprising execution component 702 in accordance with one or more embodiments described herein. Repetitive description of like elements employed in other embodiments described herein is omitted for sake of brevity. In various embodiments, the execution component 702 can execute one quantum operations on the one or more quantum computers 108 using the one or more gate parameters interpolated from the one or more reference models.

In one or more embodiments, the one or more input devices 106 can be employed to define one or more quantum circuits to be executed on the one or more quantum computers 108 to fulfill a quantum operation. Additionally, the one or more input devices 106 can be employed to define one or more target stretch factors to be utilized in one or more error mitigation protocols regarding the quantum operation. The interpolation component 502 can interpolate one or more gate parameters for achieving the target stretch factors from the one or more reference models. The execution component 702 can execute the quantum circuit with the one or more interpolated gate parameters on the one or more quantum computers 108.

For example, the execution component 702 can execute the quantum circuit on the one or more quantum computers 108 a plurality of times to generate result data. With each execution, the execution component 702 can utilize a respective interpolated gate parameter. Thus, each execution of the quantum circuit on the one or more quantum computers 108 can generate result data associated with a respective stretch factor, and thereby incorporating a respective amount of noise. In various embodiments, the execution component 702 can send one or more execution commands to the one or more quantum computer 108 via the one or more networks 104. For example, the execution component 702 can generate one or more digital signals delineating the quantum circuit to be executed by the quantum computers 108 and/or the gate parameter values to be employed by the quantum computers 108 during execution.

Figure 8:
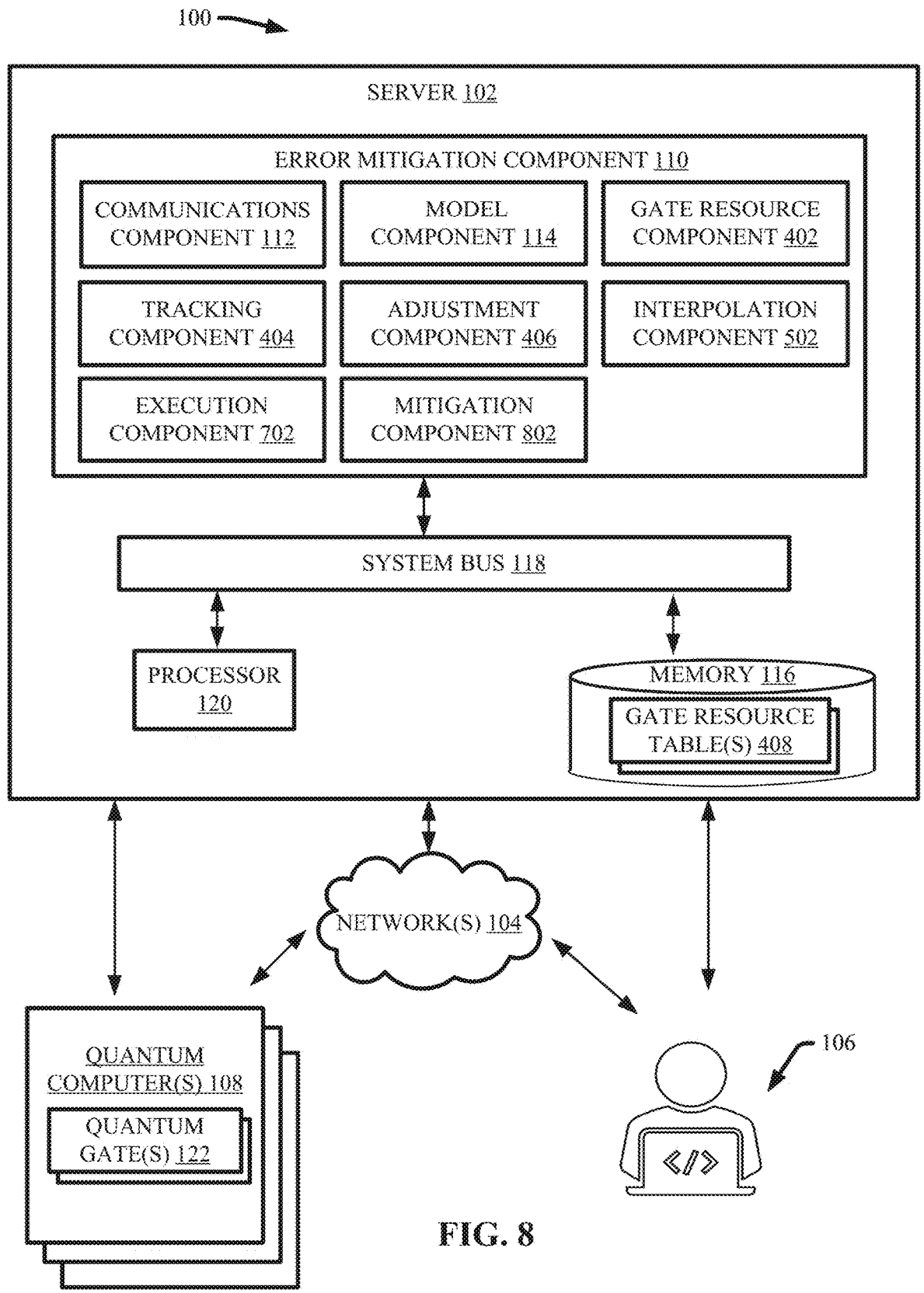
FIG. 8 illustrates a block diagram of an example, non-limiting system that can execute one or more error mitigation extrapolations to generate an error mitigated result from one or more quantum operations in accordance with one or more embodiments described herein.

FIG. 8 illustrates a diagram of the example, non-limiting system 100 further comprising mitigation component 802. Repetitive description of like elements employed in other embodiments described herein is omitted for sake of brevity. In various embodiments, the mitigation component 802 can implement one or more error mitigation protocols to remove noise from the results data. The error mitigation protocols implemented by the mitigation component 802 can identify noise based on differences between the result data generated by different executions of the quantum circuit, as influenced by the varying stretch factors. In one or more embodiments, the mitigation component 802 can generate an error mitigated result by extrapolating the result data attained by the execution component 702 to a zero-order noise limit using Richardson error mitigation or another extrapolation method.

Figure 9:
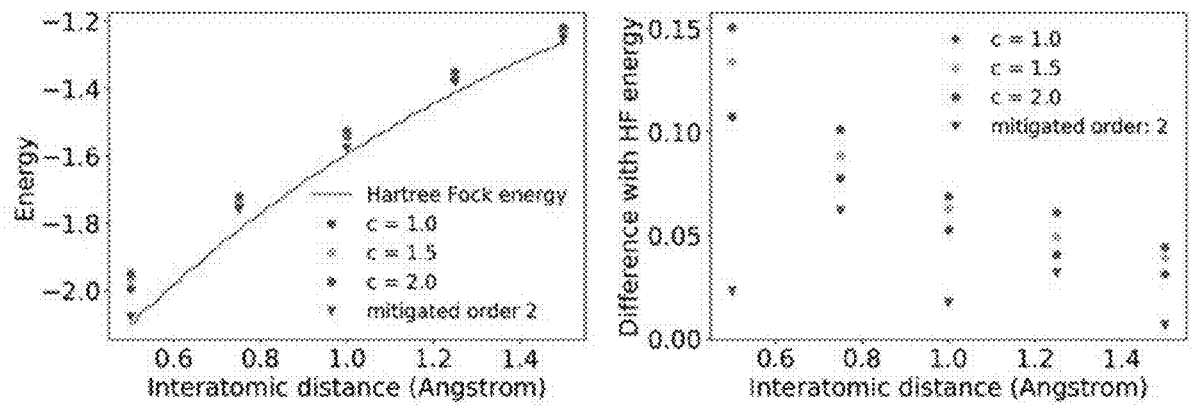
FIG. 9 illustrates a diagram of example, non-limiting graphs that can demonstrate an efficacy of a Richardson error mitigation protocol in accordance with one or more embodiments described herein.
Figure 9:
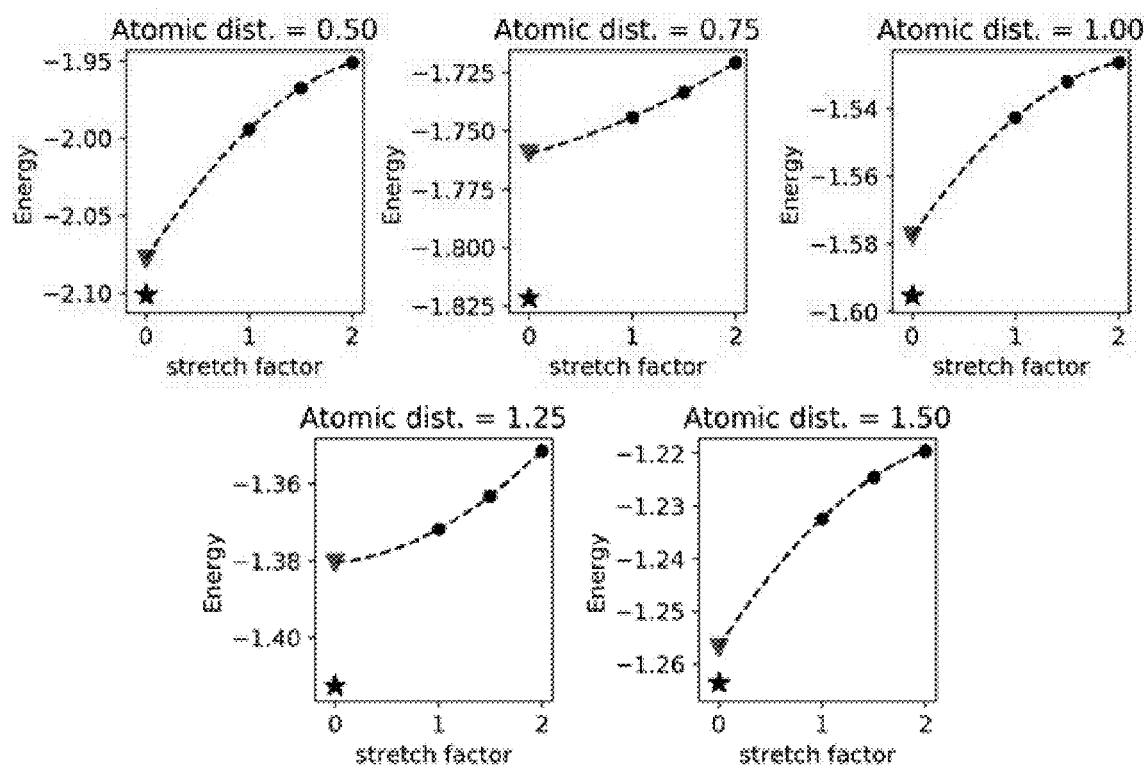

FIG. 9 illustrate a diagram of example, non-limiting graphs depicting the efficacy of the one or more error mitigation protocols implemented by the mitigation component 802 in accordance with one or more embodiments described herein. Repetitive description of like elements employed in other embodiments described herein is omitted for sake of brevity. The graphs of FIG. 9 depict a Richardson error mitigated molecular hydrogen disassociation energy curve that can be generated by the error mitigation component 110. For example, the mitigated results data depicted in FIG. 9 can regard a set of result data executed on a cloud computing-based quantum computer 108 using the target stretch factors: 1.00, 1.50, and 2.00. For instance, the gate parameters of the one or more quantum computers 108 for the target stretch factors were obtained by the interpolation component 502 by interpolating the parameters from the reference stretch factors: 1.0, 1.26, 1.58, and 2.00. The results depicted in FIG. 9 show that the error mitigated result data (e.g., indicated by triangles) are closer to the ideal result data (e.g., indicated by stars) than the execution done at a stretch factor of 1.0.

Figure 10:
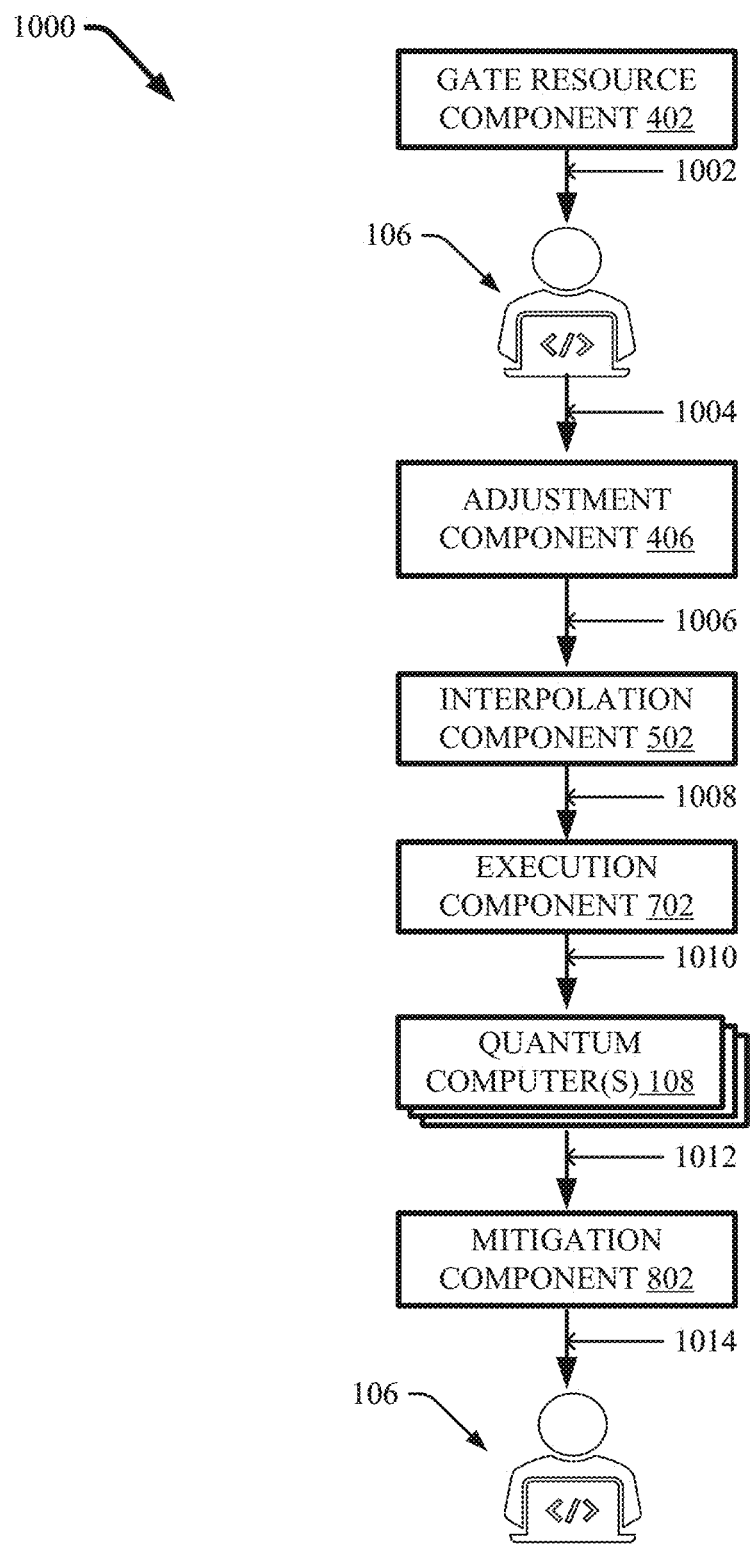
FIG. 10 illustrates a diagram of an example, non-limiting operation scheme that can be employed by one or more systems in implementing stretch factor error mitigation for quantum operations in accordance with one or more embodiments described herein.

FIG. 10 illustrates a diagram of an example, non-limiting operation scheme 1000 that can facilitate one or more error mitigation protocols performed by the error mitigation component 110 in accordance with one or more embodiments described herein. Repetitive description of like elements employed in other embodiments described herein is omitted for sake of brevity. Operation scheme 1000 can depict an exemplary, non-limiting pathway of communication between the error mitigation component 110 (e.g., and associate components of the error mitigation component 110), the one or more input devices 106, and/or the one or more quantum computers 108. In various embodiments, the communications and/or transfers of data depicted in FIG. 10 can be performed over one or more networks 104, such as a cloud computing environment. For example, the system 100 can employ a cloud computing environment to control the one or more quantum computers 108.

At 1002, the gate resource component 402 can share a stretch factor interval with one or more of the input devices 106. The stretch factor interval can be a range of stretch factors from which one or more target stretch factors can be selected for implementing the one or more error mitigation protocols described herein. In one or more embodiments, the stretch factor interval (e.g., characterized as "$[c_{min}, c_{max}]$") can be defined by the minimum stretch factor value ("$c_{min}$") and the maximum stretch factor value ("$c_{max}$") associated with a quantum gate 122 and/or a family of quantum gates 122. For example, the gate resource component 402 can analyze the one or more gate resource tables 408 with regards to one or more quantum gates 122 and/or quantum gate 122 families that are available to execute a quantum operation. The gate resource component 402 can define the minimum stretch factor value ("$c_{min}$") of the interval as the smallest minimum stretch factor value associated with the quantum gate 122 and/or quantum gate 122 family (e.g., as defined in the one or more gate resource tables 408). Also, the gate resource component 302 can define the maximum stretch factor value ("$c_{max}$") of the interval as the largest maximum stretch factor value associated with the quantum gate 122 and/or quantum gate 122 family (e.g., as defined in the one or more gate resource tables 408). Thereby, the stretch factor interval can characterize the broadest range of permissible stretch factors associated with the one or more quantum gates 122 and/or quantum gate 122 families available for operation.

The one or more input devices 106 can be employed to select one or more stretch factor values from the stretch factor interval as one or more target stretch factors for error mitigation in accordance with one or more embodiments described herein. For example, the one or more input devices 106 can be employed to select a plurality of stretch factor values from within the stretch factor interval to serve as target stretch factors. At 1004, the one or more input devices 106 can share the selected target stretch factors with the error mitigation component 110 to facilitate execution of one or more quantum operations. Additionally, at 1004 the one or more input devices 106 can be employed to define one or more quantum circuits that can be executed with the selected target stretch factors to fulfill the quantum operation.

In various embodiments, the selected target stretch factors and/or the one or more given quantum circuits can be analyzed by the adjustment component 406. As described herein, the adjustment component 406 can identify relevant quantum gates 122 of the one or more quantum computers 108 for execution of the one or more given quantum circuits. For example, where the one or more quantum computers 108 comprise a plurality of quantum gates 122, the adjustment component 406 can identify the quantum gates 122 available for operation (e.g., the quantum gates 122 that are not currently executing another quantum operation and/or are in condition for operation). Further, the adjustment component 406 can identify one or more quantum gates 122 that meet the qubit connectivity delineated by the one or more quantum circuits as relevant quantum gates 122 for the given quantum operation. For instance, the one or more given quantum circuits can delineate the number of qubits coupled by a quantum gate 122 and/or the type of coupling (e.g., including logic conditions) exhibited by the quantum gate 122, where one or more of the relevant quantum gates 122 identified by the adjustment component 406 can meet the delineations of the quantum circuits. Further, in one or more embodiments, the adjustment component 406 can further compare the one or more target stretch factors with one or more updated capabilities of the one or more relevant quantum gates 122 (e.g., updated via tracking component 404).

Where the one or more target stretch factors are outside the updated permissible stretch factor range of the one or more relevant quantum gates 122, the adjustment component 406 can alter the value of the one or more target stretch factors to be within the permissible stretch factor range. For example, the adjustment component 406 can add to, or subtract from, the one or more target stretch factor values by a minimal amount that moves the target stretch factor values into the permissible range. At 1006, the adjustment component 406 can share the one or more target stretch factors (e.g., altered or unaltered) with the interpolation component 502.

In various embodiments, the interpolation component 502 can determine one or more quantum gate 122 parameters that can achieve the one or more target stretch factors. For example, the interpolation component 502 can employ the one or more reference models (e.g., generated by the model component 114) to interpolate the one or more quantum gate 122 parameters from the one or more empirical fittings. Thereby, the interpolation component 502 can interpolate the one or more quantum gate 122 parameters from a model calibrated at a plurality of reference stretch factors. Advantageously, interpolating the one or more quantum gate parameters 122 from the calibrated reference model enables the interpolation component 502 to determine the one or more quantum gate 122 parameters without calibrating the one or more quantum computers 108 to the specific target stretch factors. At 1008, the interpolation component 502 can share the one or more interpolated quantum gate 122 parameters with the execution component 702.

In some embodiments, the interpolation component 502 can be comprised within the one or more input devices 106. For example, at 1002 the model component 114 can further share one or more interpolation functions with the one or more input devices 106. For instance, the model component 114 can generate the one or more interpolation functions based on the one or more reference models. The one or more interpolation functions can characterize the empirical fitting performed by the model component 114. Thereby, the one or more interpolation functions can output one or more quantum gate 122 parameters based on one or more target stretch factor inputs. For instance, the empirical fitting of the one or more reference models can characterize a relationship between gate parameters and stretch factors (e.g., as observed via calibrating the one or more reference stretch factors), which can be expressed as the one or more interpolation functions.

In one or more embodiments, the execution component 702 can generate one or more execution schedules based on the one or more given quantum circuits, the one or more target stretch factors, and/or the one or more interpolated quantum gate 122 parameters. The one or more execution schedules can characterize the quantum circuit as several circuits, each associated with a respective target stretch factor. For example, where two quantum circuits and three target stretch factors are defined via the one or more input devices 106, the execution component 702 can generate an execution schedule that includes six respective quantum circuits (e.g., three stretch factor-based variations for each quantum circuit). At 1010, the execution component 702 can send one or more command signals to the one or more quantum computers 108 to execute the given quantum operation. For example, the one or more command signals can characterize the one or more execution schedules and associate interpolated quantum gate 122 parameters to be executed by the one or more quantum computers 108.

The one or more quantum computers 108 can execute the one or more quantum operations based on the command signals to generate a set of result data. For example, the one or more quantum computers 108 can execute the one or more given quantum circuits in accordance with the one or more execution schedules, and thereby the one or more target stretch factors, using the associate interpolated quantum gate 122 parameters. In various embodiments, the one or more quantum computers 108 can generate a respective result dataset for each quantum circuit execution. For example, where the execution schedule includes six quantum circuit executions (e.g., two quantum circuits, each with three variations corresponding to three target stretch factors, as described above), the one or more quantum computers 108 can generate result data associated with each of the six executions. Further, the result data of all six quantum circuit executions can constitute a set of result data associated with the given quantum operation.

In one or more embodiments, the result datasets can include labels designating the context of data generation. For example, the labels can describe the quantum circuit, target stretch factor, and/or quantum gate 122 parameters that were executed by the one or more quantum computers 108 to achieve the associate result data. For instance, where a set of result data includes six datasets, each dataset can include a label (e.g., a header entry) that describes the quantum circuit, target stretch factor, and/or quantum gate 122 parameter that achieved the result data included in the dataset. At 1012 the one or more quantum computers 108 can share the set of result data for the given quantum operation with the one or more mitigation components 802.

In various embodiments, mitigation component 802 can implement one or more error mitigation protocols, such as a Richardson error mitigation protocol, to extrapolate the set of result data to the zero-noise limit. For example, the mitigation component 802 can analyze the labels of the datasets to ascertain which datasets are associated with variations of the same quantum circuit and which target stretch factor is associated with each variation. For instance, various datasets in the set of result data can characterize a given quantum circuit with varying amounts of noise based on the various target stretch factors employed. Thereby, the mitigation component 802 can extrapolate an error mitigated result from the set of result data using a Richardson error mitigation technique. At 1014, the mitigation component 802 can share the error mitigated result data with the one or more input devices 106.

Figure 11:
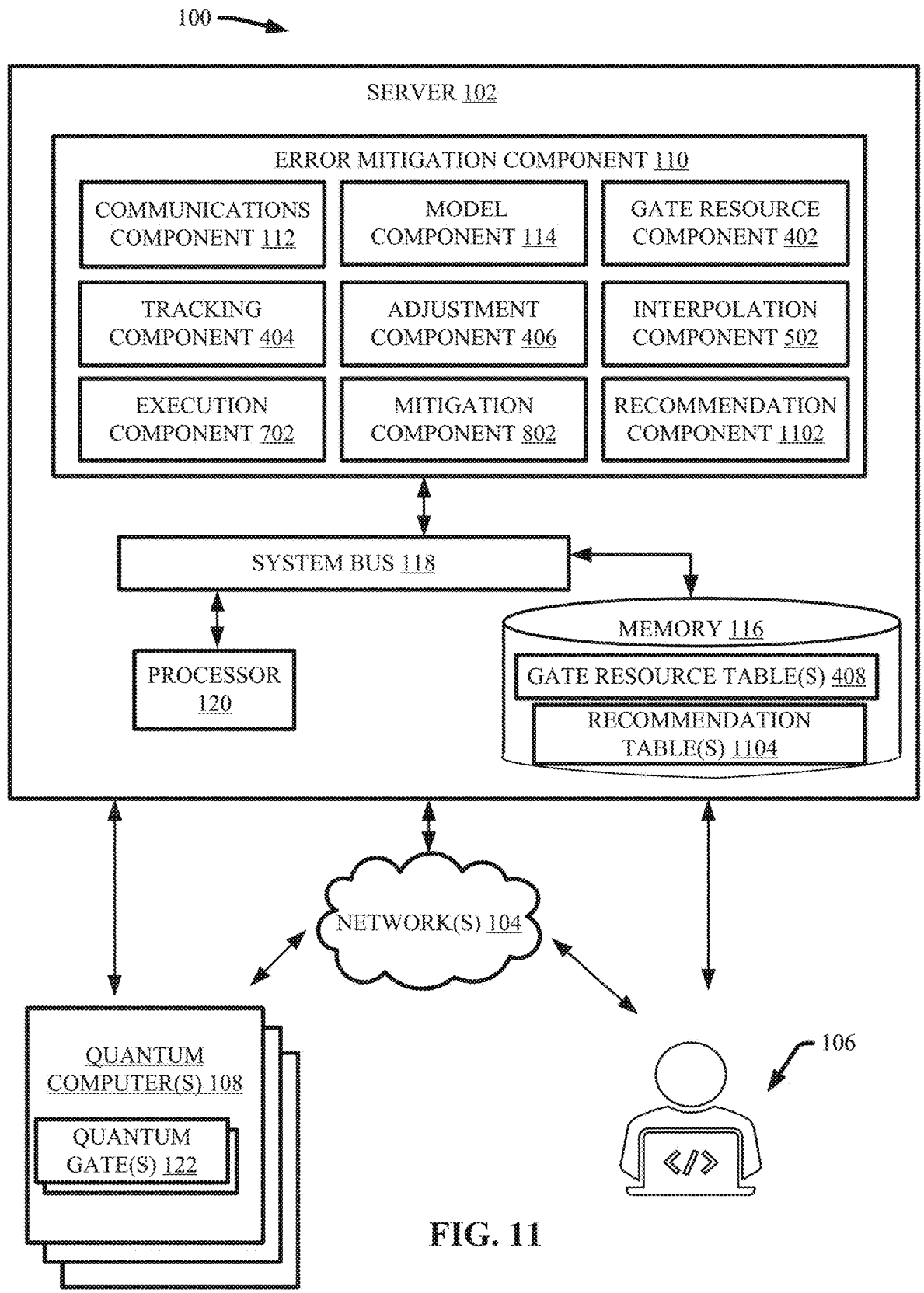
FIG. 11 illustrates a block diagram of an example, non-limiting system that can recommend one or more stretch factors to be implemented in stretch factor error mitigation in accordance with one or more embodiments described herein.

FIG. 11 illustrates a diagram of the example, non-limiting system 100 further comprising recommendation component 1102 in accordance with one or more embodiments described herein. Repetitive description of like elements employed in other embodiments described herein is omitted for sake of brevity. In various embodiments, the recommendation component 1102 can generate one or more recommended stretch factors for selection as target stretch factors via the one or more input devices 106.

In one or more embodiments, the recommendation component 1102 can generate one or more recommended stretch factors based on a count of the quantum gates 122 (e.g., a count of total quantum gates 122 and/or a count of quantum gates 122 by gate type, such as a count of one-qubit gates, two-qubit gates, and/or the like) and/or qubits of a given quantum circuit. For example, as the count of the quantum gates 122 and/or qubits for the quantum circuit increases, the maximum stretch factor recommended for execution of the quantum circuit can decrease. For instance, employing a large stretch factor value with a quantum circuit having numerous quantum gates 122 and/or qubits (e.g., a quantum circuit with high circuit depth) can result in an overwhelming amount of noise in the result data; thereby inhibiting the error mitigation protocol. For example, where the fidelity of the gates in the quantum circuit is below a given threshold (e.g., 50%), the quantum circuit can be considered too deep to be executed by the one or more quantum computers 108. The recommendation component 1102 can analyze the one or more given quantum circuits (e.g., defined via the one or more input devices 106) to determine an optimal set of stretch factors that can maximize, and/or otherwise enhance, an effectiveness of the one or more error mitigation protocols. For example, the recommendation component 1102 can analyze the one or more given quantum circuits (e.g., defined via the one or more input devices 106) to determine an optimal set of stretch factors that can achieve a desirable distribution of noise within the set of result data for the quantum operation.

In various embodiments, the recommendation component 1102 can be calibrated and/or trained via a plurality of benchmark quantum operations executed on the one or more quantum computers 108. For example, a quantum operation can be executed on the one or more quantum computers 108 a plurality times with a given stretch factor, where the quantum gate 122 count and/or qubit count can vary with each execution (e.g., thereby altering the depth of the quantum circuit). For instance, a reference all-to-all connectivity quantum alternating operator ansatz ("QAOA") can be executed (e.g., either on the one or more quantum computers 108 and/or a simulator) with several different circuit depths "p" and several different qubit counts "N" for a plurality of reference stretch factors. The set of results data achieved by the executions can define a range of permissible stretch factors recommended for a given quantum circuit profile (p, N). For example, permissible stretch factors can be stretch factors that achieve a Hellinger distance that falls below a defined threshold.

Further, the recommendation component 1102 can generate and/or populate one or more recommendation tables 1104 based on the execution of the one or more benchmark quantum operations. As shown in FIG. 11, the one or more recommendation tables 1104 can be stored, for example, in the one or more memories 116. For example, the one or more recommendation tables 1104 can designate a plurality of quantum circuit profiles (p, N) (e.g., a plurality of quantum circuits having various combinations of gate counts and/or qubit counts, and thereby various circuit depths). The recommendation component 1102 can populate the one or more recommendation tables 1104 with the permissible stretch factor ranges associated with each quantum circuit profile (p, N).

The recommendation component 1102 can compare one or more given quantum circuits (e.g., provided via the one or more input devices 106) with the quantum circuit profiles of the one or more recommendation tables 1104. Where the one or more quantum circuits have the same circuit depth (e.g., same gate count and qubit count combination) as a quantum circuit profile of the one or more recommendation tables 1104, the recommendation component 1102 can identify the associate permissible stretch factor range as a recommended stretch factor range. Where the one or more given quantum circuits have circuit depth (e.g., same gate count and qubit count combination) different from the quantum circuit profiles, the recommendation component 1102 can identify the permissible stretch factor range associated with the closest matching quantum circuit profile (e.g., the quantum circuit profile having the smallest deviation in the quantum gate 122 and/or qubit count combination from the one or more given quantum circuits).

In various embodiments, the recommendation component 1102 can share the recommended stretch factor range with the one or more input devices 106 for selection of the one or more target stretch factors (e.g., where the one or more input devices 106 can be employed to select the target stretch factors from the recommended stretch factor range). In one or more embodiments, the recommendation component 1102 can select one or more stretch factors from the associate permissible stretch factor range as recommended target stretch factors (e.g., the recommended target stretch factors can be linearly spaced between a value of 1.0 and the maximum stretch factor associated with the given quantum gate 122). Further, the recommendation component 1102 can share the one or more recommended stretch factors with the one or more input devices 106 for approval via the one or more input devices 106.

In one or more embodiments, the recommendation component 1102 can implement one or more heuristic approaches to determining the one or more recommended stretch factors. For example, the recommendation component 1102 can generate the one or more recommended target stretch factors based on a count of the number of single-qubit quantum gates 122 and/or two-qubit quantum gates 122 delineated by a given quantum circuit along with the error rates observed for the quantum gates 122 during calibration at the one or more reference stretch factors.

Figure 12:
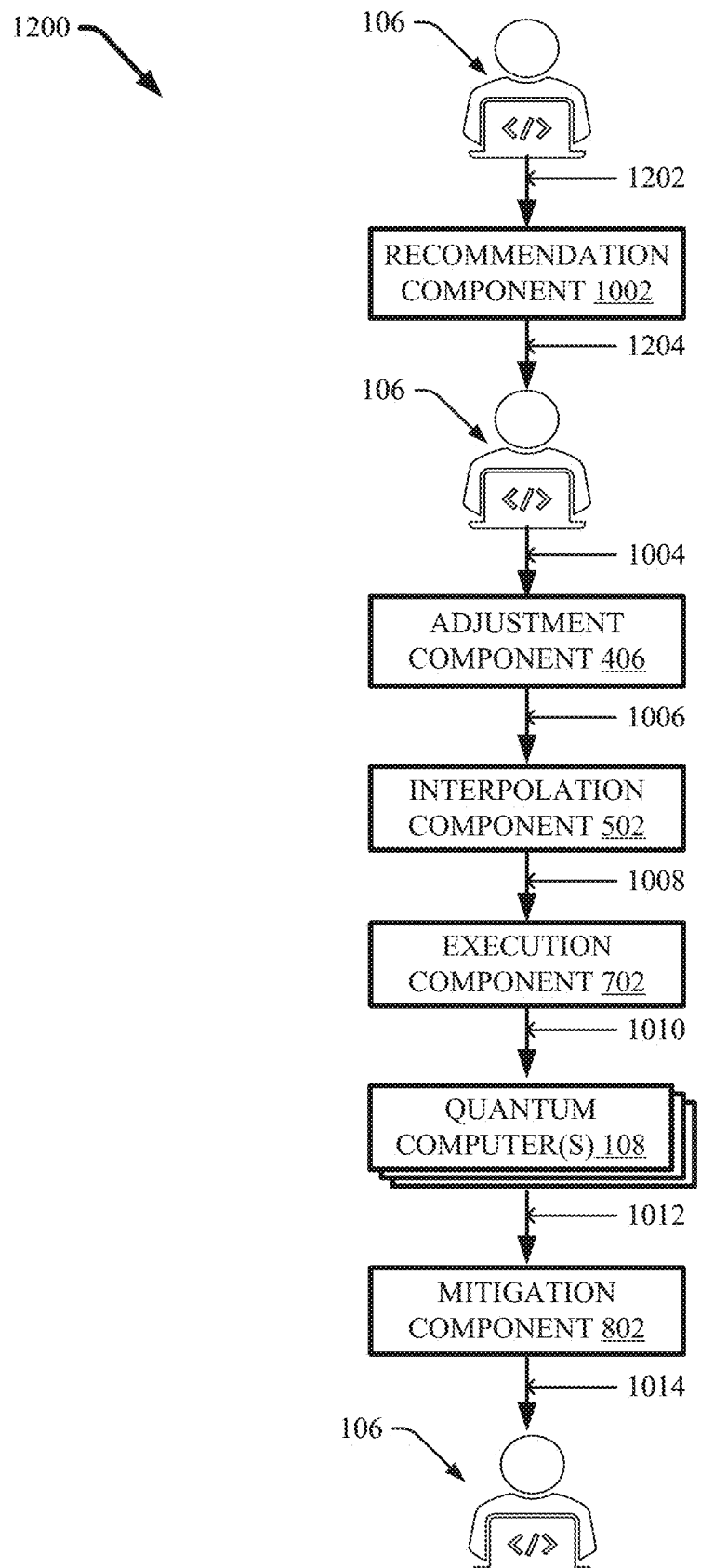
FIG. 12 illustrates a diagram of an example, non-limiting operation scheme that can be employed by one or more systems in implementing stretch factor error mitigation for quantum operations in accordance with one or more embodiments described herein.

FIG. 12 illustrates an example, non-limiting operation scheme 1200 that can facilitate one or more error mitigation protocols performed by the error mitigation component 110 in accordance with one or more embodiments described herein. Repetitive description of like elements employed in other embodiments described herein is omitted for sake of brevity. Operation scheme 1200 can depict an exemplary, non-limiting pathway of communication between the error mitigation component 110 (e.g., and associate components of the error mitigation component 110), the one or more input devices 106, and/or the one or more quantum computers 108. In various embodiments, the communications and/or transfers of data depicted in FIG. 12 can be performed over one or more networks 104, such as a cloud computing environment. For example, the system 100 can employ a cloud computing environment to control the one or more quantum computers 108.

In comparison to operation scheme 1000, operation scheme 1200 incorporates recommendation component 1102. For example, one or more input devices 106 can be employed to define one or more quantum circuits for executing one or more quantum operations on the one or more quantum computers 108. At 1202, the one or more input devices 106 can share the one or more given quantum circuits with the recommendation component 1202. The recommendation component 1102 can generate one or more recommendations, including, but not limited to: a plurality of recommended stretch factors, a range of recommended stretch factors, a combination thereof, and/or the like. For example, the recommendation component 1102 can compare the one or more given quantum circuits to one or more quantum circuit profiles stored in the one or more recommendation tables 1004 in accordance with various embodiments described herein.

At 1204 the recommendation component 1102 can share the one or more recommendations with one or more input devices 106 for approval and/or selection. For example, the one or more input devices 106 can be employed to approve one or more recommended stretch factors as target stretch factors to be utilized in one or more error mitigation protocols in accordance with various embodiments described herein. In another example, the one or more input devices 106 can be employed to select one or more target stretch factors from a recommended range of stretch factors.

Thereafter operation scheme 1200 can implement steps 1006-1014 described herein with reference to operation scheme 1000. For example, the one or more input devices 106 can share the one or more target stretch factors (e.g., which can comprise approved recommended stretch factors, stretch factors selected from a recommended range, and/or stretch factors defined independent of one or more recommendations generated by the recommendation component 1102) with the adjustment component 406 to facilitate compatibility with the capacities of the one or more quantum gates 122 of the quantum computers 108 executing the one or more quantum operations. Thereafter, the one or more given quantum circuits can be executed with the target stretch factors on the one or more quantum computers 108 in accordance with the various embodiments described herein. Further, result data generated by the executions on the quantum computers 108 can be subject to one or more error mitigation protocols, such as Richardson error mitigation.

Figure 13:
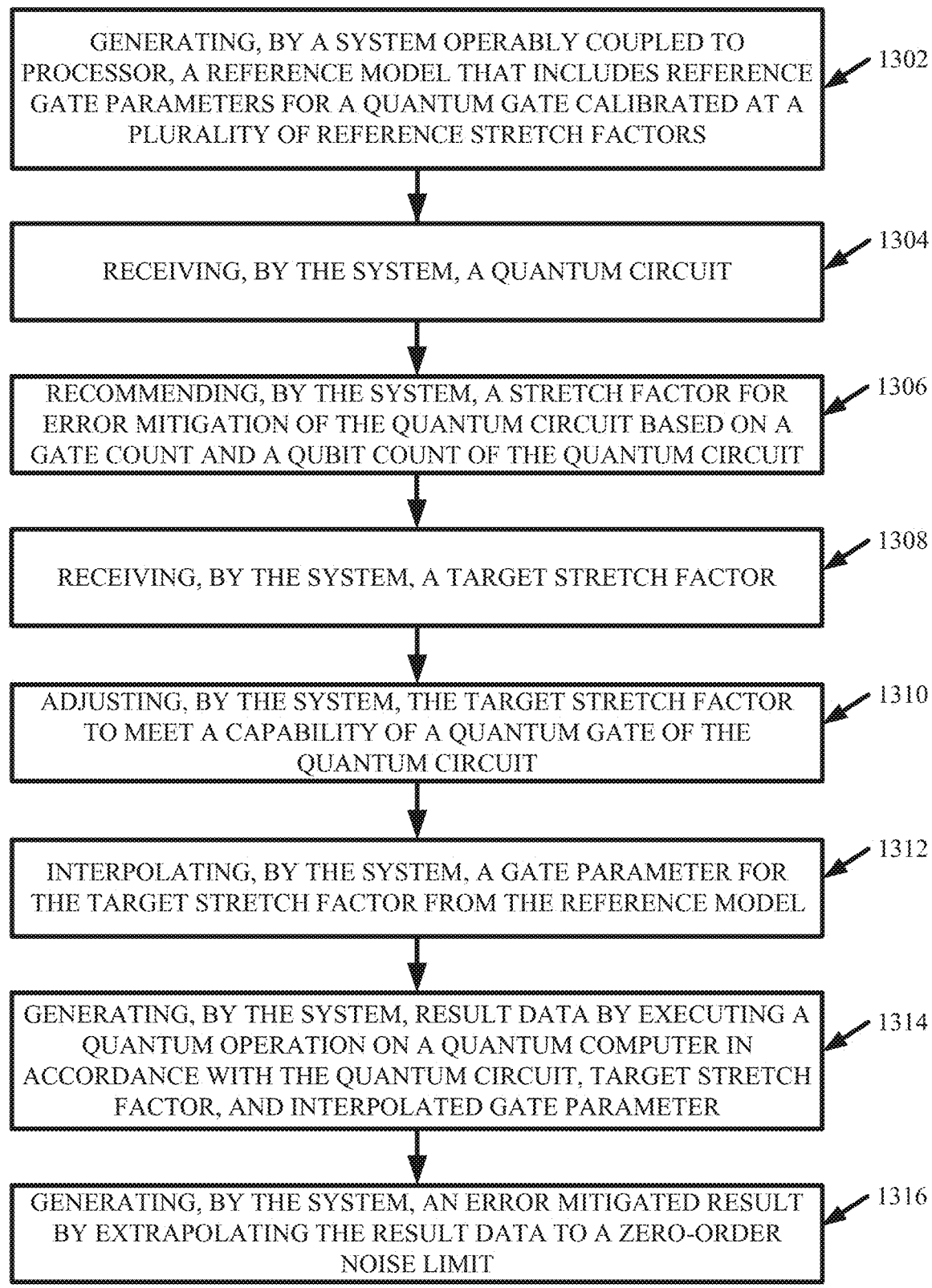
FIG. 13 illustrates a flow diagram of an example, non-limiting computer-implemented method that can facilitate one or more stretch factor error mitigations in accordance with one or more embodiments described herein.

FIG. 13 illustrates a flow diagram of an example, non-limiting computer-implemented method 1300 that can facilitate executing one or more quantum operations on one or more quantum computers 108 with error mitigation in accordance with one or more embodiments described herein. Repetitive description of like elements employed in other embodiments described herein is omitted for sake of brevity.

At 1302, the computer-implemented method 1300 can comprise generating (e.g., via model component 114), by a system 100 operably coupled to a processor 120, one or more reference models that can include reference gate parameters for one or more quantum gates 122 calibrated at a plurality of reference stretch factors. At 1304, the computer-implemented method 1300 can comprise receiving (e.g., via error mitigation component 110), by the system 100, one or more quantum circuits. For example, one or more input devices 106 can be employed to define the one or more quantum circuits, which can delineate how one or more quantum operations are executed on a quantum computer 108 (e.g., can delineate the number of qubits utilized, the number of quantum gates 122 utilized, the connectivity of the qubits and/or quantum gates 122, the type of quantum gates 122 utilized, measurement operations, qubit reset operations, the number of times to repeat each quantum circuit to gather statistics, a combination thereof, and/or the like).

At 1306, the computer-implemented method 1300 can comprise recommending (e.g., via recommendation component 1102), by the system 100, one or more stretch factors for error mitigation of the quantum circuit based on a gate count and/or a qubit count of the quantum circuit. For example, the recommendation component 1102 can identify one or more recommended stretch factors and/or an interval of recommended stretch factors to be employed with the quantum circuit based on at least a circuit depth of the quantum circuit in accordance with various embodiments described herein. Further, the recommended stretch factors can be shared with one or more input devices 106 for selection and/or approval. At 1308, the computer-implemented method 1300 can comprise receiving (e.g., via the error mitigation component 110), by the system 100, one or more target stretch factors to be employed with the quantum circuit to facilitate one or more error mitigation protocols. For example, the one or more input devices 106 can be employed to: select one or more of the recommended stretch factors as target stretch factors, to select one or more target stretch factors from a range of recommended stretch factors, and/or to define one or more target stretch factors that were not recommended.

At 1310, the computer-implemented method 1300 can comprise adjusting (e.g., via the adjustment component 406), by the system 100, the one or more target stretch factors to meet one or more capabilities of one or more quantum gates 122 of the quantum circuit. For example, the one or more target stretch factors values can be altered based on one or more fluctuations in the operating capabilities of the one or more quantum gates 122 in accordance with the various embodiments described herein. At 1312, the computer-implemented method 1300 can comprise interpolating (e.g., via interpolation component 502), by the system 100, one or more quantum gate 122 parameters for the one or more target stretch factors from the one or more reference models. At 1314, the computer-implemented method 1300 can comprise generating (e.g., via execution component 702), by the system 100, result data by executing a quantum operation on one or more quantum computers 108 in accordance with the one or more given quantum circuits, target stretch factors, and/or interpolated gate parameters. For example, the execution component 702 can generate one or more execution schedules in accordance with the various embodiments described herein to generate a set of results data associated with execution of the quantum circuit with varying amounts of noise due to varying target stretch factors. At 1316, the computer-implemented method 1300 can comprise generating (e.g., via mitigation component 802), by the system 100, an error mitigated result by extrapolating the result data to a zero-order noise limit. For example, the mitigation component 802 can implement a Richardson error mitigation protocol in accordance with the various embodiments described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
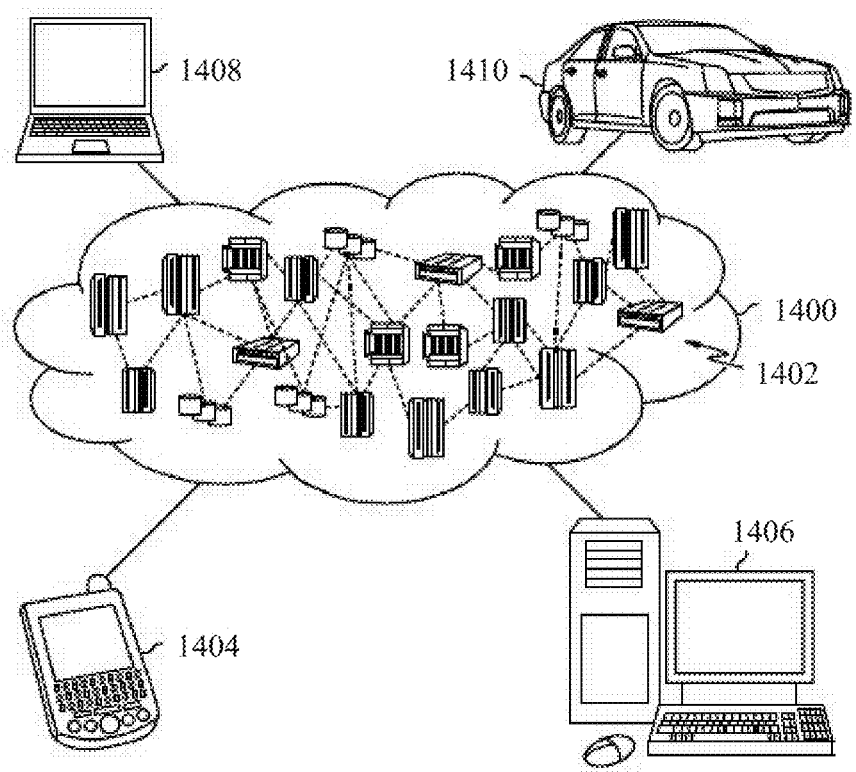
FIG. 14 depicts a cloud computing environment in accordance with one or more embodiments described herein.

Referring now to FIG. 14, illustrative cloud computing environment 1400 is depicted. As shown, cloud computing environment 1400 includes one or more cloud computing nodes 1402 with which local computing devices used by cloud consumers, such as, for example, personal digital assistant (PDA) or cellular telephone 1404, desktop computer 1406, laptop computer 1408, and/or automobile computer system 1410 may communicate. Nodes 1402 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms and/or software as services for which a cloud consumer does not need to maintain resources on a local computing device. It is understood that the types of computing devices 1404-1410 shown in FIG. 14 are intended to be illustrative only and that computing nodes 1402 and cloud computing environment 1400 can communicate with any type of computerized device over any type of network and/or network addressable connection (e.g., using a web browser).

Figure 15:
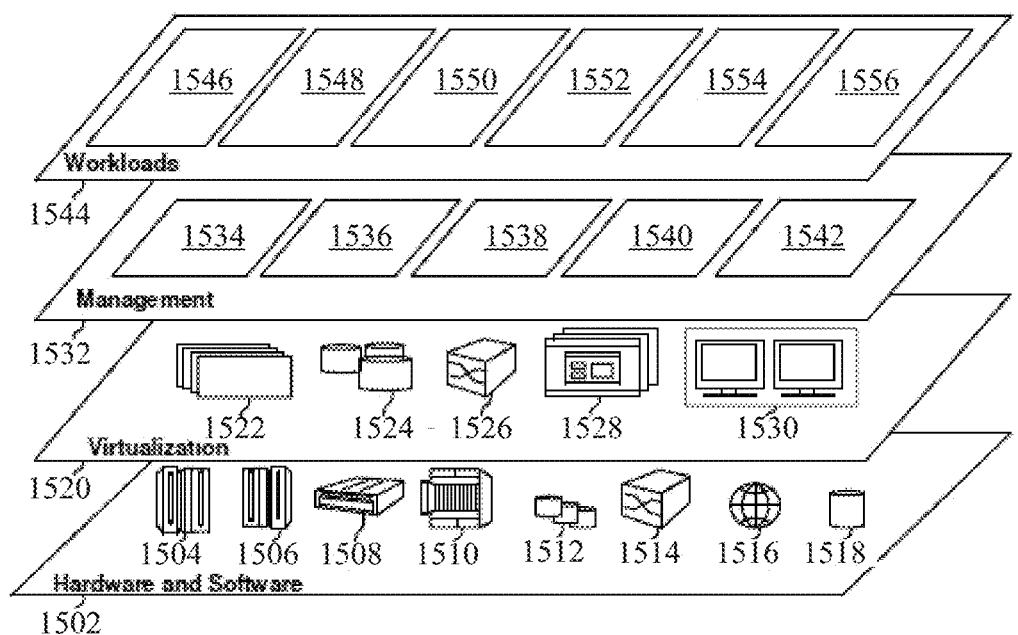
FIG. 15 depicts abstraction model layers in accordance with one or more embodiments described herein

Referring now to FIG. 15, a set of functional abstraction layers provided by cloud computing environment 1400 (FIG. 14) is shown. Repetitive description of like elements employed in other embodiments described herein is omitted for sake of brevity. It should be understood in advance that the components, layers, and functions shown in FIG. 15 are intended to be illustrative only and embodiments of the invention are not limited thereto. As depicted, the following layers and corresponding functions are provided.

Hardware and software layer 1502 includes hardware and software components. Examples of hardware components include: mainframes 1504; RISC (Reduced Instruction Set Computer) architecture based servers 1506; servers 1508; blade servers 1510; storage devices 1512; and networks and networking components 1514. In some embodiments, software components include network application server software 1516 and database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530.

In one example, management layer 1532 may provide the functions described below. Resource provisioning 1534 provides dynamic procurement of computing resources and other resources that are utilized to perform tasks within the cloud computing environment. Metering and Pricing 1536 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provide pre-arrangement for, and procurement of, cloud computing resources for which a future requirement is anticipated in accordance with an SLA.

Workloads layer 1544 provides examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and quantum computing 1556. Various embodiments of the present invention can utilize the cloud computing environment described with reference to FIGS. 14 and 15 to control one or more quantum computers 108 and/or execute one or more error mitigation protocols in accordance with various embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 16:
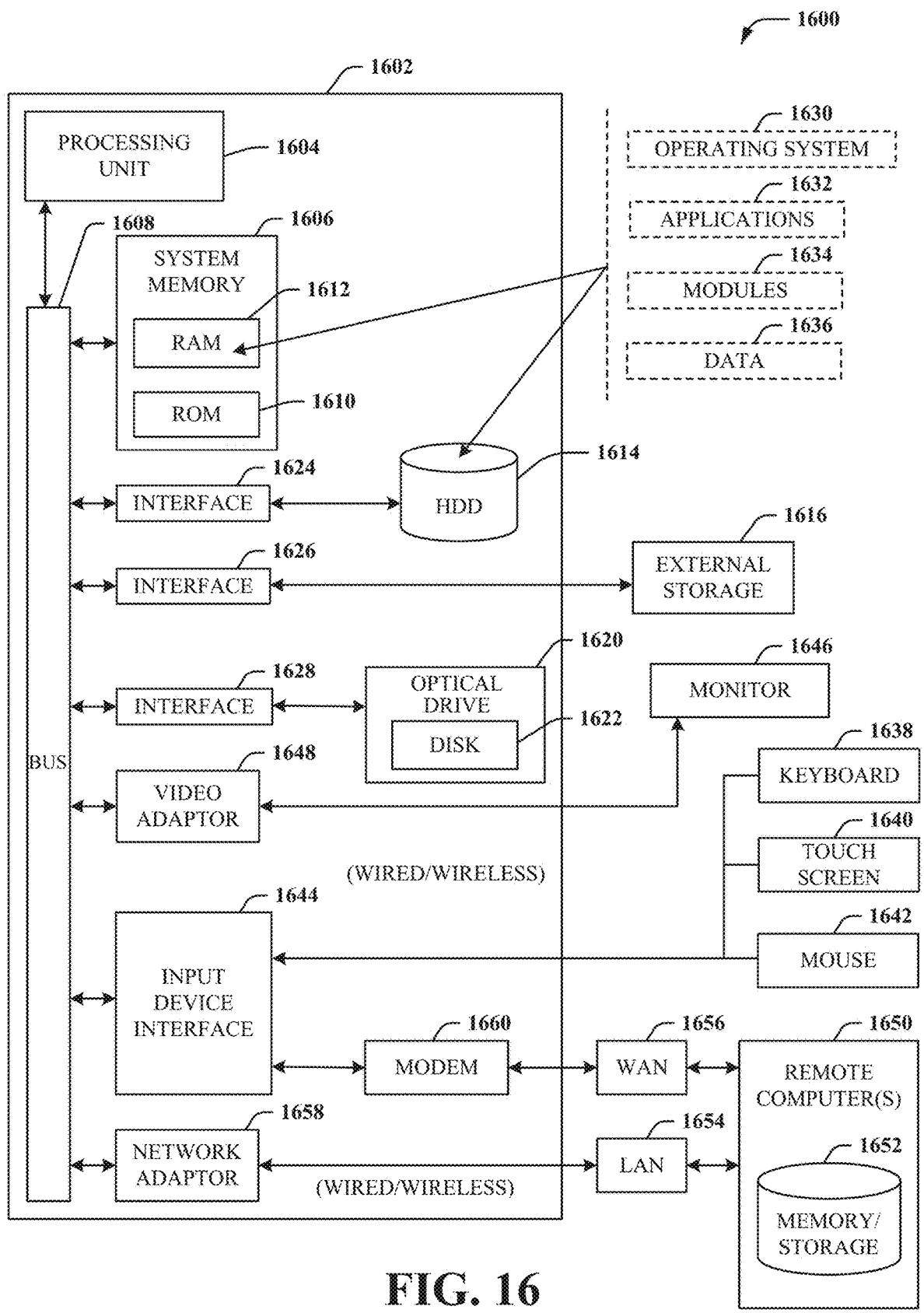
FIG. 16 illustrates a block diagram of an example, non-limiting operating environment in which one or more embodiments described herein can be facilitated.

In order to provide additional context for various embodiments described herein, FIG. 16 and the following discussion are intended to provide a general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system ("BIOS") can be stored in a non-volatile memory such as ROM, erasable programmable read only memory ("EPROM"), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive ("HDD") 1614 (e.g., EIDE, SATA), one or more external storage devices 1616 (e.g., a magnetic floppy disk drive ("FDD") 1616, a memory stick or flash drive reader, a memory card reader, etc.) and an optical disk drive 1620

(e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive ("SSD") could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine ("VM") of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1602, e.g., applied at the application execution level or at the operating system ("OS") kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network ("LAN") 1654 and/or larger networks, e.g., a wide area network ("WAN") 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point ("AP") disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory to perform operations comprising:
determining a stretch factor interval for a quantum gate of a quantum circuit based on at least one operating characteristic of the quantum gate;
executing, based on the quantum circuit, a quantum operation using the stretch factor interval to generate results data; and
storing an error mitigated result based on performing an extrapolation process on the result data.

2. The system of claim 1, wherein the operations further comprise determining a number of reference stretch factors to include within the stretch factor interval based on variations in respective errors per Clifford values for the quantum gate represented in the at least one operating characteristic of the quantum gate.

3. The system of claim 1, wherein the operations further comprise determining respective values for reference stretch factors to include within the stretch factor interval based on respective errors per Clifford values for the quantum gate represented in the at least one operating characteristic of the quantum gate.

4. The system of claim 1, wherein the operations further comprise determining a number of reference stretch factors to include within the stretch factor interval based on a parameter value for a parameter of the quantum gate.

5. The system of claim 1, wherein the operations further comprise determining respective values for reference stretch factors to include within the stretch factor interval based on a parameter value for a parameter of the quantum gate.

6. The system of claim 1, wherein the operations further comprise determining the stretch factor interval further based on a criterion associated with a calibration overhead.

7. The system of claim 1, wherein the operations further comprise determining the stretch factor interval further based on at least of a minimum stretch factor or maximum stretch factor for the quantum gate.

8. A computer-implemented method, comprising:
determining, by a system operatively coupled to a processor, a stretch factor interval for a quantum gate of a quantum circuit based on at least one operating characteristic of the quantum gate;
executing, by the system, via the quantum circuit, a quantum operation using the stretch factor interval to generate results data; and
storing, by the system, an error mitigated result based on performing an extrapolation process on the result data.

9. The computer-implemented method of claim 8, wherein the determining the stretch factor interval comprises determining a number of reference stretch factors to include within the stretch factor interval based on variations in respective errors per Clifford values for the quantum gate represented in the at least one operating characteristic of the quantum gate.

10. The computer-implemented method of claim 8, wherein the determining the stretch factor interval comprises determining respective values for reference stretch factors to include within the stretch factor interval based on respective errors per Clifford values for the quantum gate represented in the at least one operating characteristic of the quantum gate.

11. The computer-implemented method of claim 8, wherein the determining the stretch factor interval comprises determining a number of reference stretch factors to include within the stretch factor interval based on a parameter value for a parameter of the quantum gate.

12. The computer-implemented method of claim 8, wherein the determining the stretch factor interval comprises determining respective values for reference stretch factors to include within the stretch factor interval based on a parameter value for a parameter of the quantum gate.

13. The computer-implemented method of claim 8, wherein the determining the stretch factor interval is further based on a criterion associated with a calibration overhead.

14. The computer-implemented method of claim 8, wherein the determining the stretch factor interval is further based on at least of a minimum stretch factor or maximum stretch factor for the quantum gate.

15. A computer program product for quantum computer error mitigation, the computer program product comprising a computer readable storage medium having program instructions embodied therewith, the program instructions executable by a processor to cause the processor to:

determining a stretch factor interval for a quantum gate of a quantum circuit based on at least one operating characteristic of the quantum gate; and executing, via the quantum circuit, a quantum operation using the stretch factor interval to generate results data; and storing an error mitigated result based on performing an extrapolation process on the result data.

16. The computer program product of claim 15, wherein the determining the stretch factor interval comprises determining a number of reference stretch factors to include within the stretch factor interval based on variations in respective errors per Clifford values for the quantum gate represented in the at least one operating characteristic of the quantum gate.

17. The computer program product of claim 15, wherein the determining the stretch factor interval comprises determining respective values for reference stretch factors to include within the stretch factor interval based on respective errors per Clifford values for the quantum gate represented in the at least one operating characteristic of the quantum gate.

18. The computer program product of claim 15, wherein the determining the stretch factor interval comprises determining a number of reference stretch factors to include within the stretch factor interval based on a parameter value for a parameter of the quantum gate.

19. The computer program product of claim 15, wherein the determining the stretch factor interval comprises determining respective values for reference stretch factors to include within the stretch factor interval based on a parameter value for a parameter of the quantum gate.

20. The computer program product of claim 15, wherein the determining the stretch factor interval is further based on a criterion associated with a calibration overhead.

* * * * *